United States Patent
Tamura

(10) Patent No.: US 11,111,437 B2
(45) Date of Patent: Sep. 7, 2021

(54) LIQUID CRYSTAL COMPOSITION, OPTICALLY ANISOTROPIC LAYER, OPTICAL LAMINATE, AND IMAGE DISPLAY DEVICE

(71) Applicant: FUJIFILM Corporation, Tokyo (JP)

(72) Inventor: Akio Tamura, Minamiashigara (JP)

(73) Assignee: FUJIFILM Corporation, Tokyo (JP)

(*) Notice: Subject to any disclaimer, the term of this patent is extended or adjusted under 35 U.S.C. 154(b) by 101 days.

(21) Appl. No.: 16/509,695

(22) Filed: Jul. 12, 2019

(65) Prior Publication Data

US 2019/0338189 A1 Nov. 7, 2019

Related U.S. Application Data

(63) Continuation of application No. PCT/JP2018/007142, filed on Feb. 27, 2018.

(30) Foreign Application Priority Data

Mar. 22, 2017 (JP) .............................. JP2017-056140

(51) Int. Cl.
*G02F 1/1333* (2006.01)
*C09K 19/38* (2006.01)
*C09K 19/56* (2006.01)
*G02F 1/13363* (2006.01)
*C09K 19/54* (2006.01)

(52) U.S. Cl.
CPC ........ *C09K 19/3861* (2013.01); *C09K 19/542* (2013.01); *C09K 19/56* (2013.01); *G02F 1/13363* (2013.01); *C09K 2019/548* (2013.01); *G02F 1/133633* (2021.01)

(58) Field of Classification Search
CPC .. C09K 19/3861; C09K 19/542; C09K 19/56; C09K 2019/548; G02F 1/1333; G02F 1/13363; G02F 2001/133633
USPC .................................................... 252/299.01
See application file for complete search history.

(56) References Cited

U.S. PATENT DOCUMENTS

| 2014/0002773 | A1 | 1/2014 | Hirai |
| 2015/0322346 | A1* | 11/2015 | Tanabe ................ G02F 1/13363 523/437 |
| 2017/0283701 | A1 | 10/2017 | Tamura et al. |
| 2019/0338189 | A1* | 11/2019 | Tamura .................. C09K 19/54 |

FOREIGN PATENT DOCUMENTS

| CN | 105683828 A | 6/2016 | |
| JP | 2002-265946 A | 9/2002 | |
| JP | 2007-297606 A | 11/2007 | |
| JP | 2007-332229 A | 12/2007 | |
| JP | 2014-28916 A | 2/2014 | |
| JP | 2014-215360 A | 11/2014 | |
| WO | WO 2016-092844 A1 | 6/2016 | |
| WO | WO 2017/010560 A1 * | 1/2017 | ............. C09K 19/56 |

OTHER PUBLICATIONS

International Preliminary Report on Patentability and Written Opinion of the International Searching Authority (Forms PCT/IB/326, PCT/IB/373, and PCT/ISA/237) for International Application No. PCT/JP2018/007142, dated Oct. 3, 2019, with English translation.
International Search Report (Form PCT/ISA/210) for International Application No. PCT/JP2018/007142, dated Apr. 10, 2018, with English translation.
Japanese Office Action, dated Jul. 28, 2020, for corresponding Japanese Application No. 2019-507476, with an English translation.
Japanese Office Action dated Apr. 21, 2020, for corresponding Japanese Application No. 2019-507476, with an English translation.
Chinese Office Action and Search Report for corresponding Chinese Application No. 201880008026.7, dated Jan. 28, 2021, with English translation.

* cited by examiner

*Primary Examiner* — Geraldina Visconti
(74) *Attorney, Agent, or Firm* — Birch, Stewart, Kolasch & Birch LLP

(57) ABSTRACT

A liquid crystal composition contains a liquid crystal compound; a photo-alignment compound; and a polymer obtained by polymerizing a monomer having two or more radically polymerizable double bonds and one or more hydroxyl groups.

12 Claims, No Drawings

LIQUID CRYSTAL COMPOSITION, OPTICALLY ANISOTROPIC LAYER, OPTICAL LAMINATE, AND IMAGE DISPLAY DEVICE

CROSS-REFERENCE TO RELATED APPLICATIONS

This application is a Continuation of PCT International Application No. PCT/JP2018/007142, filed on Feb. 27, 2018, which claims priority under 35 U.S.C. § 119(a) to Japanese Patent Application No. 2017-056140, filed on Mar. 22, 2017. Each of the above application(s) is hereby expressly incorporated by reference, in its entirety, into the present application.

BACKGROUND OF THE INVENTION

1. Field of the Invention

The present invention relates to a liquid crystal composition, an optically anisotropic layer, an optical laminate, and an image display device.

2. Description of the Related Art

Optical films such as optical compensation sheets or retardation films are used in various image display devices from the viewpoint of solving image staining or enlarging a view angle.

A stretched birefringence film has been used as an optical film, but in recent years, it has been proposed to use an optically anisotropic layer formed of a liquid crystal compound in place of the stretched birefringence film.

For example, as a liquid crystal composition which forms an optically anisotropic layer for a lower layer in producing an optical laminate having at least two optically anisotropic layers, JP2014-215360A discloses "a liquid crystal composition containing a liquid crystal compound having a polymerizable group and a photo-alignment compound" ([claim 1]).

SUMMARY OF THE INVENTION

The inventors have conducted studies on more rapidly forming a plurality of optically anisotropic layers by using the liquid crystal composition described in JP2014-215360A, and found that there is room for relaxing time and temperature conditions (hereinafter, referred to as "aging conditions") required until the liquid crystal compound is aligned in forming an optically anisotropic layer.

Accordingly, an object of the invention is to provide a liquid crystal composition capable of maintaining an excellent plane state and aligning properties of an optically anisotropic layer to be produced even in a case where relaxed aging conditions are employed, an optically anisotropic layer formed using the liquid crystal composition, an optical laminate, and an image display device.

The inventors have conducted intensive studies to achieve the object, and as a result, found that by using a liquid crystal composition obtained by blending a polymer obtained by polymerizing a monomer having two or more radically polymerizable double bonds and one or more hydroxyl groups with a liquid crystal compound and a photo-alignment compound, it is possible to maintain an excellent plane state and aligning properties of an optically anisotropic layer to be produced even in a case where relaxed aging conditions are employed, and completed the invention.

That is, the inventors have found that the object can be achieved with the following configuration.

[1] A liquid crystal composition comprising: a liquid crystal compound; a photo-alignment compound; and a polymer obtained by polymerizing a monomer having two or more radically polymerizable double bonds and one or more hydroxyl groups.

[2] The liquid crystal composition according to [1], in which the polymer is obtained by polymerizing a monomer represented by Formula X.

Formula X

In Formula X, $Z^{X1}$ and $Z^{X2}$ each independently represent a group having a radically polymerizable double bond, $L^{X1}$ and $L^{X4}$ each independently represent a single bond or an alkylene group having a hydroxyl group, $L^{X2}$ and $L^{X3}$ each independently represent a single bond, or a divalent linking group formed of at least one selected from the group consisting of —O—, —(C=O)O—, —O(C=O)—, a divalent chain group, an alkylene group having a hydroxyl group, and a divalent aliphatic cyclic group, at least one of $L^{X1}$, $L^{X2}$, $L^{X3}$, or $L^{X4}$ is an alkylene group having a hydroxyl group, M represents a single bond or a di- to tetra-valent linking group, and n represents an integer of 1 to 3.

[3] The liquid crystal composition according to [1] or [2], in which the polymer is obtained by polymerizing a monomer represented by Formula X1.

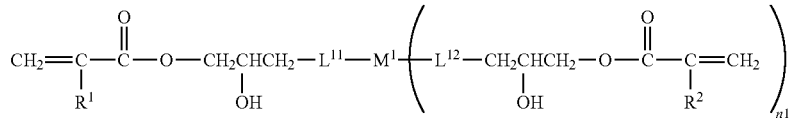

Formula XI

In Formula X1, $R^1$ and $R^2$ each independently represent a hydrogen atom or an alkyl group having 1 to 20 carbon atoms, $L^{11}$ and $L^{12}$ each independently represent a single bond, or a divalent linking group formed of at least one selected from the group consisting of —O—, —(C=O)O—, —O(C=O)—, a divalent chain group, an alkylene group having a hydroxyl group, and a divalent aliphatic cyclic group, $M^1$ represents a single bond or a di- to tetra-valent linking group, and n1 represents an integer of 1 to 3.

[4] The liquid crystal composition according to any one of [1] to [3], in which the polymer has a partial structure obtained by polymerizing a compound having a fluorine atom.

[5] The liquid crystal composition according to [4], in which the compound having a fluorine atom is represented by Formula a.

Formula a

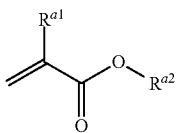

In Formula a, $R^{a1}$ represents a hydrogen atom or an alkyl group having 1 to 20 carbon atoms, and $R^{a2}$ represents an alkyl group having 1 to 20 carbon atoms in which at least one carbon atom has a fluorine atom as a substituent.

[6] The liquid crystal composition according to any one of [1] to [5], in which the photo-alignment compound is a photo-sensitive compound having a photo-reactive group which is subjected to at least one of dimerization or isomerization by the action of light, and the photo-reactive group has a skeleton of at least one type of derivative or compound selected from the group consisting of cinnamic acid derivatives, coumarin derivatives, chalcone derivatives, maleimide derivatives, azobenzene compounds, stilbene compounds and spiropyran compounds.

[7] An optically anisotropic layer which is formed using the liquid crystal composition according to any one of [1] to [6].

[8] An optical laminate comprising: a support; and a first optically anisotropic layer provided on the support, in which the first optically anisotropic layer is the optically anisotropic layer according to [7].

[9] The optical laminate according to [8], further comprising: a second optically anisotropic layer provided on the first optically anisotropic layer.

[10] The optical laminate according to [9], in which the second optically anisotropic layer is formed using a liquid crystal composition containing a liquid crystal compound.

[11] The optical laminate according to [9] or [10], in which the first optically anisotropic layer and the second optically anisotropic layer are in contact with each other.

[12] An image display device comprising: the optically anisotropic layer according to [7] or the optical laminate according to any one of [8] to [11].

According to the invention, it is possible to provide a liquid crystal composition capable of maintaining an excellent plane state and aligning properties of an optically anisotropic layer to be produced even in a case where relaxed aging conditions are employed, an optically anisotropic layer formed using the liquid crystal composition, an optical laminate, and an image display device.

DESCRIPTION OF THE PREFERRED EMBODIMENTS

Hereinafter, the invention will be described in detail.

The following description of constituent requirements is based on typical embodiments of the invention, but the invention is not limited thereto.

In this specification, a numerical value range expressed using "to" means a range including numerical values before and after "to" as a lower limit value and an upper limit value.

[Liquid Crystal Composition]

A liquid crystal composition according to the embodiment of the invention contains a liquid crystal compound, a photo-alignment compound, and a polymer obtained by polymerizing a monomer having two or more radically polymerizable double bonds and one or more hydroxyl groups (hereinafter, also referred to as "specific polymer").

In the invention, as described above, by using a liquid crystal composition obtained by blending a specific polymer with a liquid crystal compound and a photo-alignment compound, it is possible to maintain an excellent plane state and aligning properties of an optically anisotropic layer to be produced even in a case where relaxed aging conditions are employed.

Although the detailed reason for this is not clear, the inventors presume as follows.

That is, the reason for this is thought to be that the aligning properties of the liquid crystal compound and the phase separation properties of the photo-alignment compound are improved by the presence of the hydroxyl group of the specific polymer, that is, the polar group. This can also be inferred from comparison results between Example 1 and Comparative Example 1 and comparison results between Example 12 and Comparative Example 2 to be described later.

Hereinafter, components of the liquid crystal composition according to the embodiment of the invention will be described in detail.

[Liquid Crystal Compound]

The liquid crystal compound contained in the liquid crystal composition according to the embodiment of the invention is not particularly limited, and a liquid crystal compound which has been known can be contained.

Here, in general, liquid crystal compounds can be classified into a rod-like type and a disk-like type according to the shape thereof. Furthermore, each type includes a low molecular type and a high molecular type. The term high molecular generally refers to a compound having a degree of polymerization of 100 or greater (Polymer Physics-Phase Transition Dynamics, written by Masao Doi, p. 2, published by Iwanami Shoten, 1992). In the invention, any type of liquid crystal compound can be used, but a rod-like liquid crystal compound or a discotic liquid crystal compound (disk-like liquid crystal compound) is preferably used. Two or more types of rod-like liquid crystal compounds, two or more types of disk-like liquid crystal compounds, or a mixture of a rod-like liquid crystal compound and a disk-like liquid crystal compound may be used. In order to fix the above-described liquid crystal compound, it is more preferable to use a rod-like liquid crystal compound or a disk-like liquid crystal compound having a polymerizable group, and it is even more preferable that the liquid crystal compound has two or more polymerizable groups in one molecule. In a case where the liquid crystal compound is a mixture of two or more types, at least one type of liquid crystal compound preferably has two or more polymerizable groups in one molecule.

As the rod-like liquid crystal compound, for example, those described in claim 1 of JP1999-513019A (JP-H11-513019A) or paragraphs <0026> to <0098> of JP2005-289980A can be preferably used, and as the discotic liquid crystal compound, for example, those described in paragraphs <0020> to <0067> of JP2007-108732A or paragraphs <0013> to <0108> of JP2010-244038A can be preferably used. However, the liquid crystal compounds are not limited thereto.

In the invention, a liquid crystal compound having reciprocal wavelength dispersibility can be used as the above-described liquid crystal compound.

Here, in this specification, the liquid crystal compound having "reciprocal wavelength dispersibility" refers to the fact that in the measurement of an in-plane retardation (Re) value at a specific wavelength (visible light range) of a retardation film produced using the liquid crystal compound, as the measurement wavelength increases, the Re value becomes equal or higher.

The liquid crystal compound having reciprocal wavelength dispersibility is not particularly limited as long as a film having reciprocal wavelength dispersibility can be formed as described above, and for example, compounds represented by Formula (I) described in JP2008-297210A (particularly, compounds described in paragraphs <0034> to <0039>), compounds represented by Formula (1) described in JP2010-084032A (particularly, compounds described in paragraphs <0067> to <0073>), and compounds represented by Formula (1) described in JP2016-081035A (particularly, compounds described in paragraphs <0043> to <0055>) can be used.

[Photo-Alignment Compound]

The photo-alignment compound contained in the liquid crystal composition according to the embodiment of the invention refers to a compound in which rearrangement or an anisotropic chemical reaction is induced by irradiation with light having anisotropy (for example, plane-polarized light).

In the invention, in producing an optical laminate having at least two optically anisotropic layers as in JP2014-215360A, an optically anisotropic layer for a lower layer (first optically anisotropic layer to be described later) is formed using a liquid crystal composition containing the photo-alignment compound, and thus a rubbing treatment is not required for the optically anisotropic layer for a lower layer.

In the invention, the photo-alignment compound is preferably a photo-sensitive compound having a photo-reactive group which is subjected to at least one of dimerization or isomerization by the action of light since it is excellent in alignment uniformity and its thermal or chemical stability is also good.

Here, specific suitable examples of the photo-reactive group which is dimerized by the action of light include groups having a skeleton of at least one type of derivative selected from the group consisting of cinnamic acid derivatives (M. Schadt et al., J. Appl. Phys., vol. 31, No. 7, page 2155 (1992)), coumarin derivatives (M. Schadt et al., Nature., vol. 381, page 212 (1996)), chalcone derivatives (Toshihiro Ogawa et al., Preprints of Symposium on Liquid Crystals (Ekisho Toronkai Koen Yokoshu in Japanese), 2AB03 (1997)), maleimide derivatives, and benzophenone derivatives (Y K. Jang et al., SID Int. Symposium Digest, P-53 (1997)). Among these, photo-reactive groups having a skeleton of at least one type of derivative selected from the group consisting of cinnamic acid derivatives, coumarin derivatives, chalcone derivatives, and maleimide derivatives are preferable.

Specific suitable examples of the photo-reactive group which is isomerized by the action of light include groups having a skeleton of at least one type of compound selected from the group consisting of azobenzene compounds (K. Ichimura et al., Mol. Cryst. Liq. Cryst., 298, 221 (1997)), stilbene compounds. (J. G. Victor and J. M. Torkelson, Macromolecules, 20, 2241 (1987)), spiropyran compounds (K. Ichimura et al., Chemistry Letters, page 1063 (1992); K. Ichimura et al., Thin Solid Films, vol. 235, page 101 (1993)), cinnamic acid compounds (K. Ichimura et al., Macromolecules, 30, 903 (1997)), and hydrazono-β-ketoester compounds (S. Yamamura et al., Liquid Crystals, vol. 13, No. 2, page 189 (1993)). Among these, groups having a skeleton of at least one type of compound selected from the group consisting of azobenzene compounds, stilbene compounds, and spiropyran compounds are preferable.

The photo-sensitive compound is preferably a photo-sensitive polymer compound, that is, a photo-sensitive polymer having a photo-reactive group which is subjected to at least one of dimerization or isomerization by the action of light. The photo-sensitive polymer compound also includes a compound having skeletons of the derivatives and the compounds described above as the photo-reactive group in a polymer main chain or a side chain.

The photo-sensitive polymer compound is not particularly limited, and examples thereof include polymers described in JP2007-297606A, JP2012-027654A, or JP2015-031823A. Among these, polymers having a repeating unit represented by Formula (I) or (II) are preferable since the molecular design of the side chain becomes diverse and the main chain is easily formed.

(I)

(II)

In Formulae (I) and (II), R represents a hydrogen atom or an alkyl group having 1 to 6 carbon atoms, L represents a single bond or a divalent linking group, and P represents a photo-reactive group.

Here, In Formulae (I) and (II), R is preferably a hydrogen atom or an alkyl group having 1 to 4 carbon atoms (for example, a methyl group, an ethyl group, an n-propyl group, an isopropyl group, an n-butyl group, or the like). Among these, a hydrogen atom or a methyl group is more preferable.

Preferable specific examples of the photo-sensitive polymer compound having a repeating unit represented by Formula (I) will be shown below, but the invention is not limited thereto.

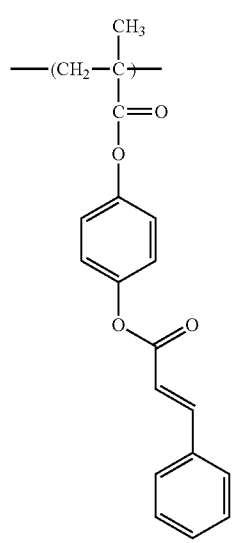
P-1
Mw = 21000
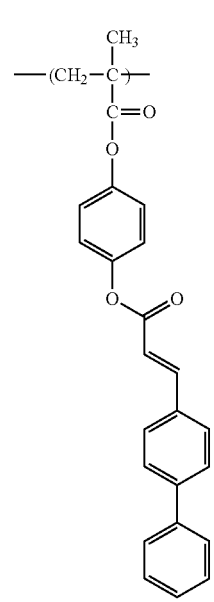
P-2
Mw = 17000
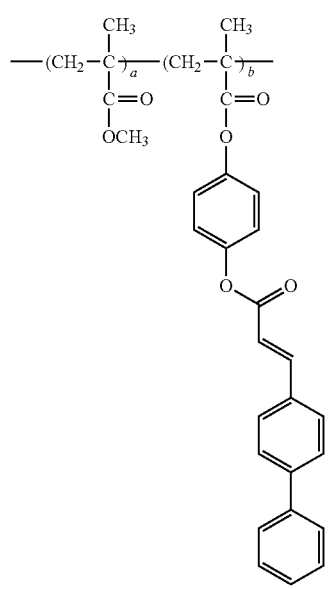
P-3
Mw = 33000
a/b = 50/50
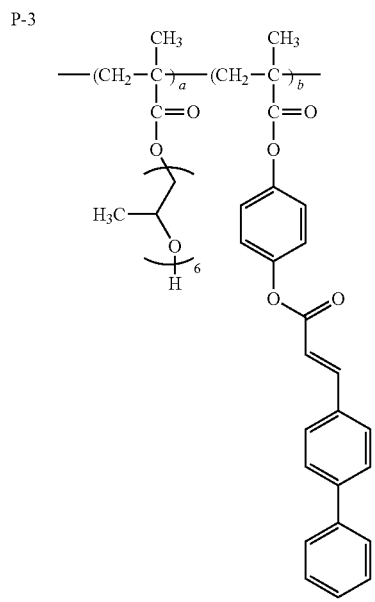
P-4
Mw = 27000
a/b = 30/70

-continued
P-5
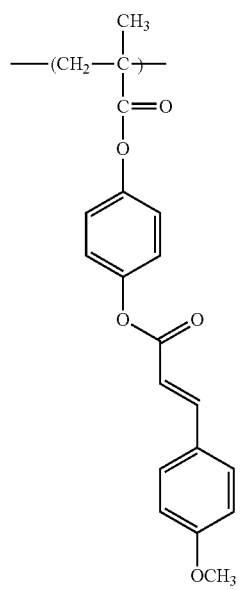
Mw = 31000
P-6
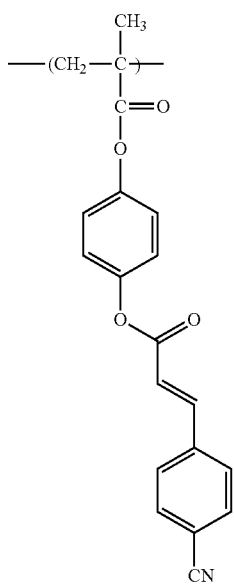
Mw = 27000
P-7
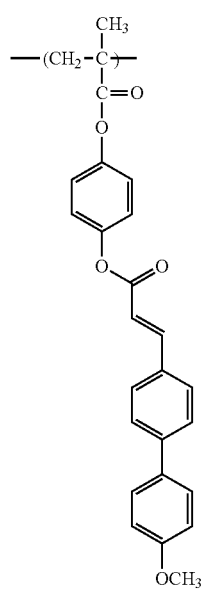
Mw = 25000
P-8
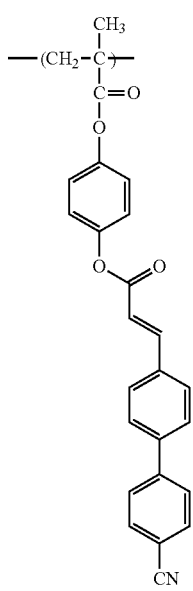
Mw = 27000

-continued
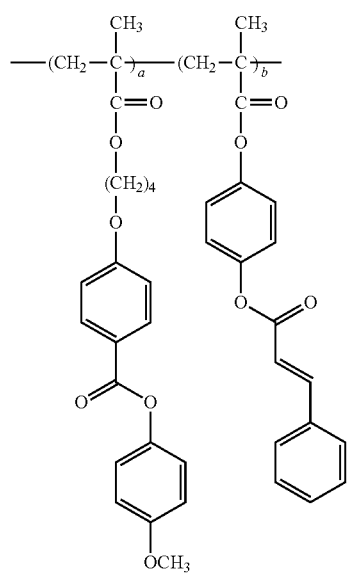
P-9
Mw = 33000
a/b = 50/50
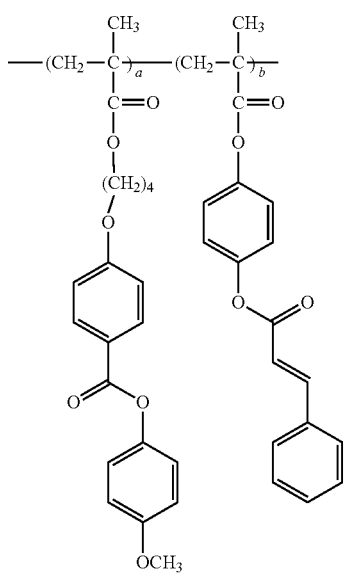
P-10
Mw = 33000
a/b = 30/70
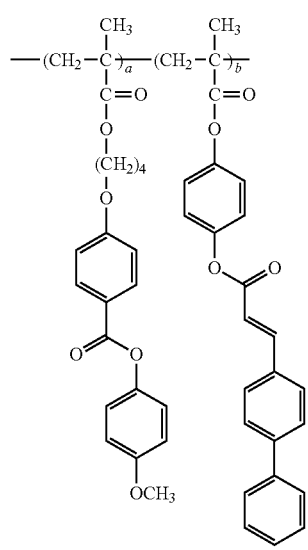
P-11
Mw = 33000
a/b = 50/50
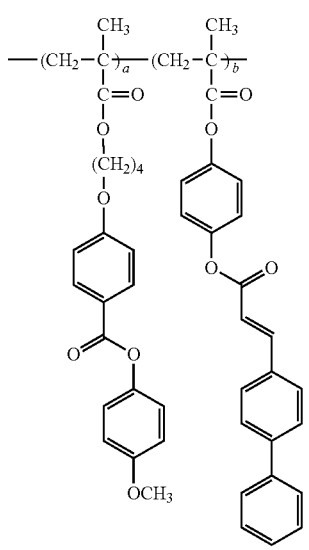
P-12
Mw = 33000
a/b = 30/70

-continued
P-13
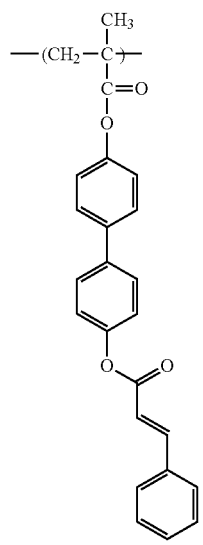
Mw = 25000
P-14
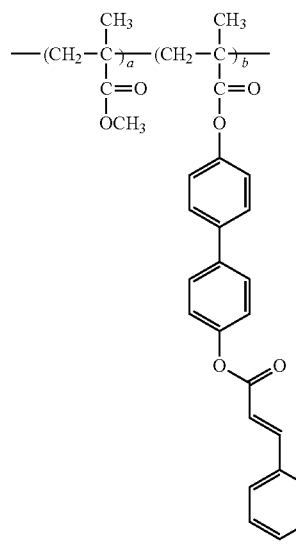
Mw = 33000
a/b = 50/50
P-15
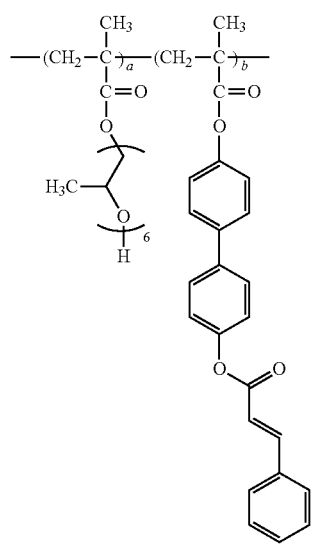
Mw = 27000
a/b = 30/70
P-16
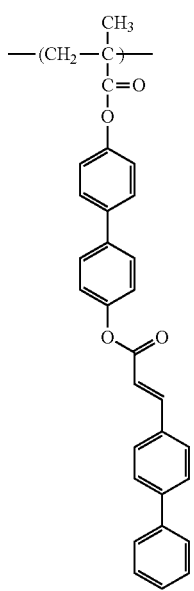
Mw = 25000

-continued
P-17
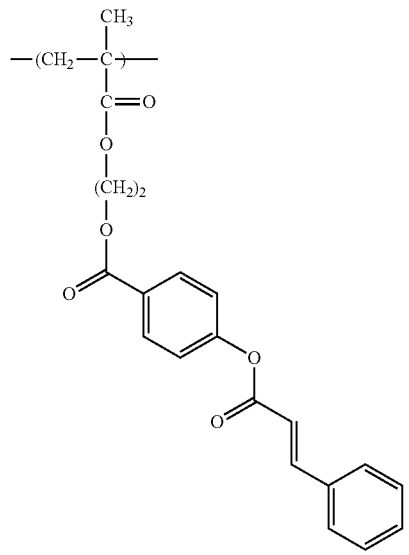
Mw = 33000
P-18
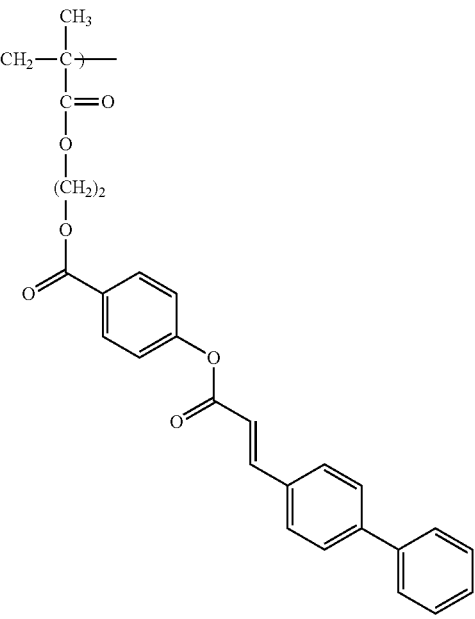
Mw = 33000
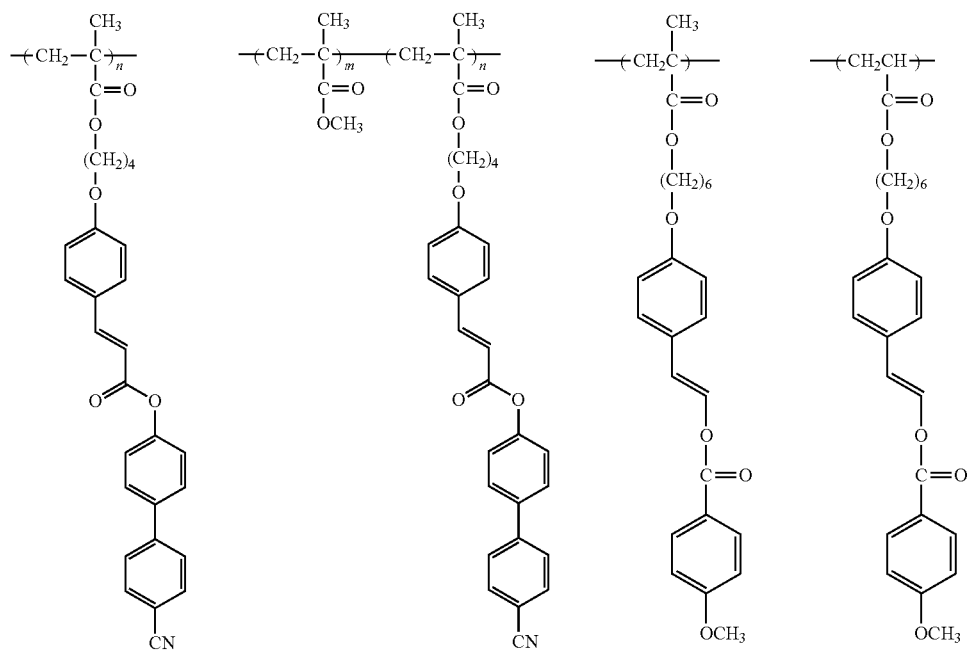

-continued
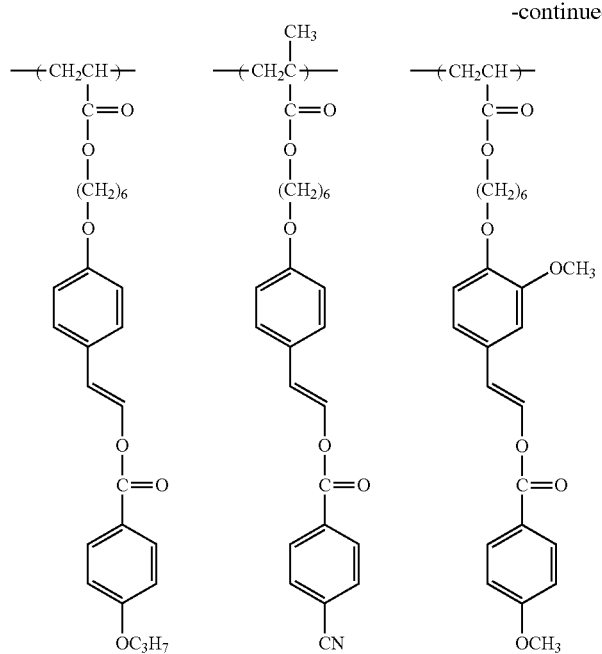
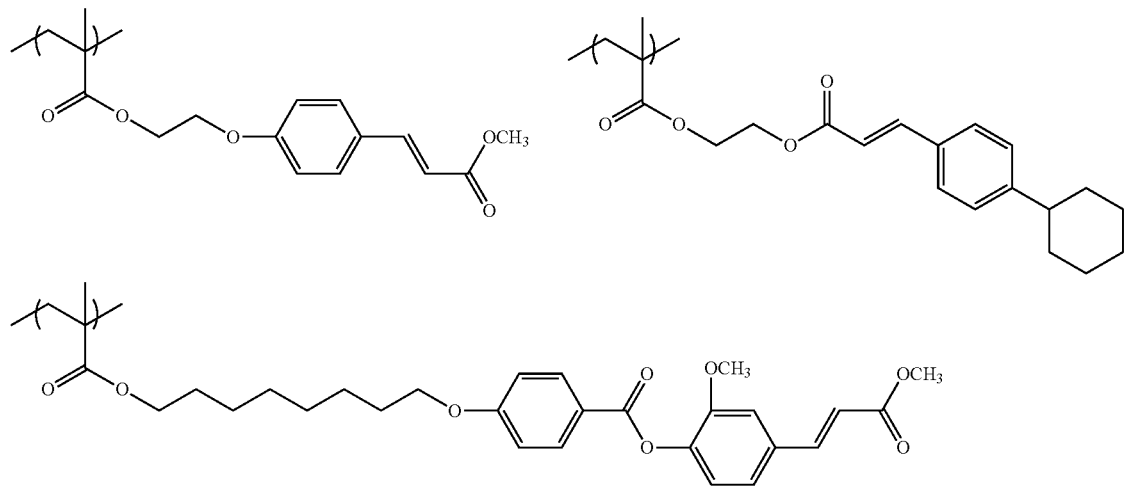
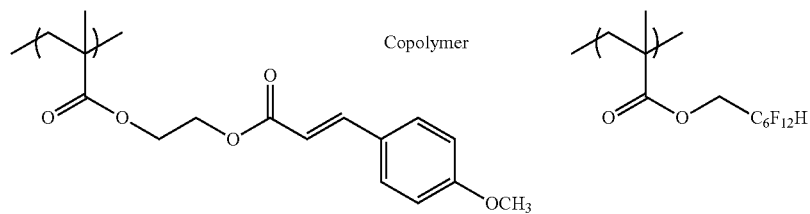
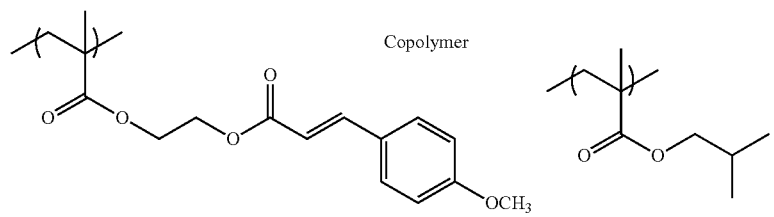

-continued
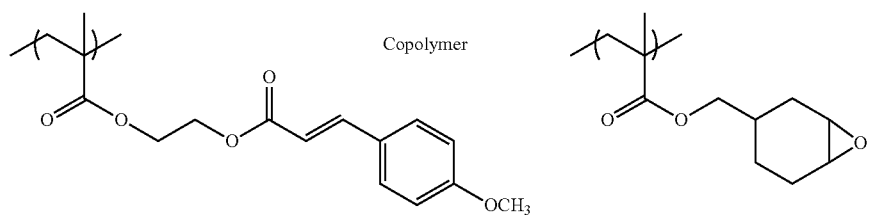
Copolymer
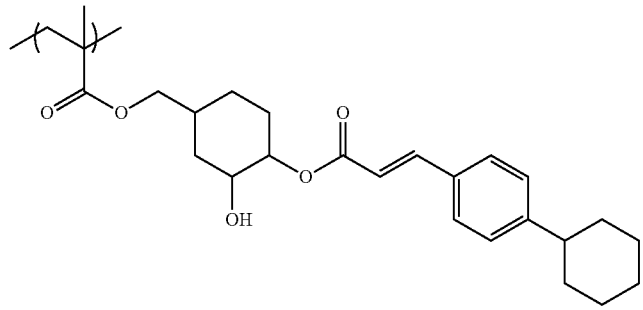
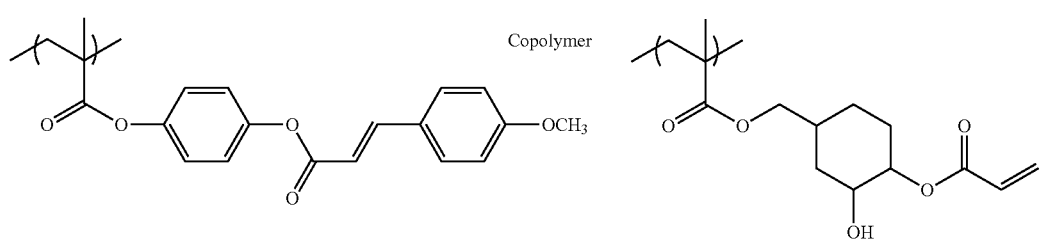
Copolymer
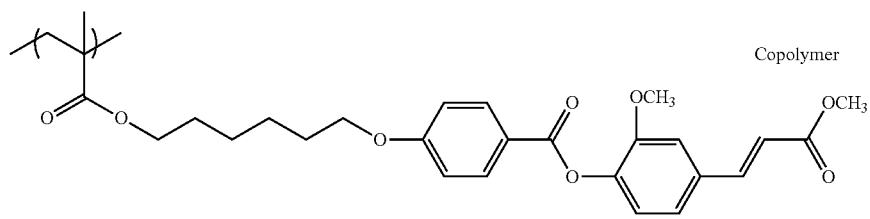
Copolymer
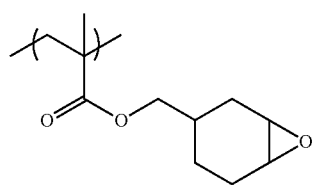
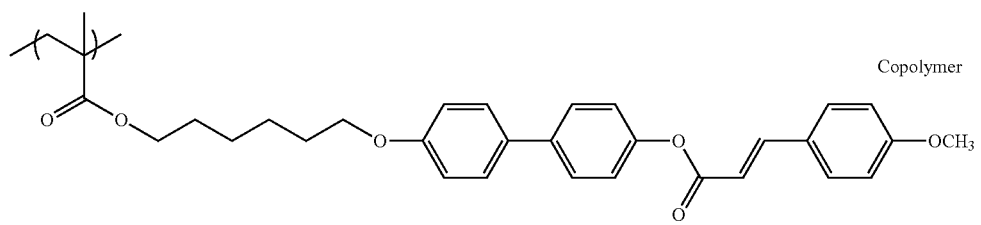
Copolymer
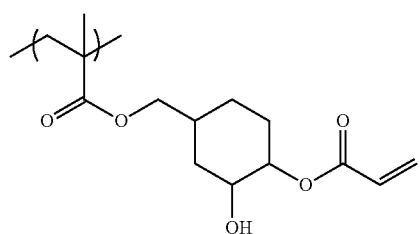

-continued
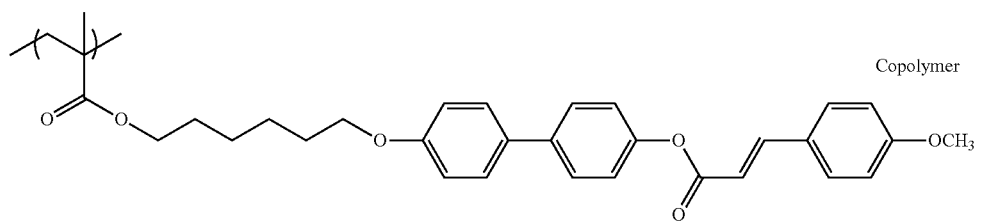
Copolymer
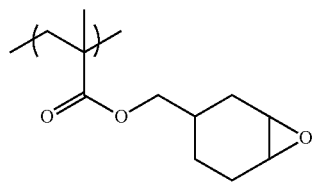
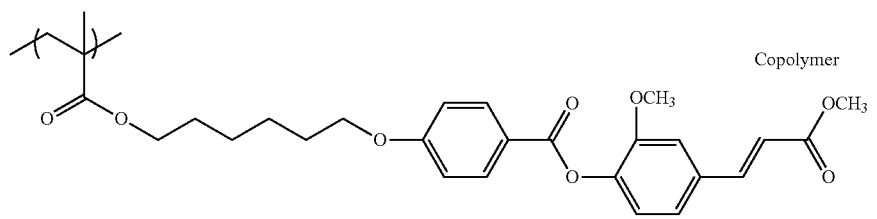
Copolymer
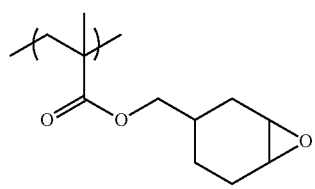
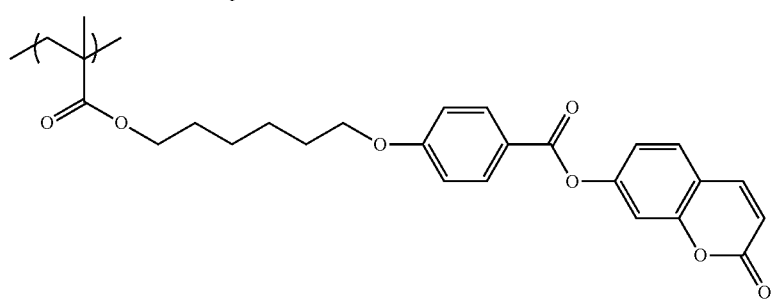
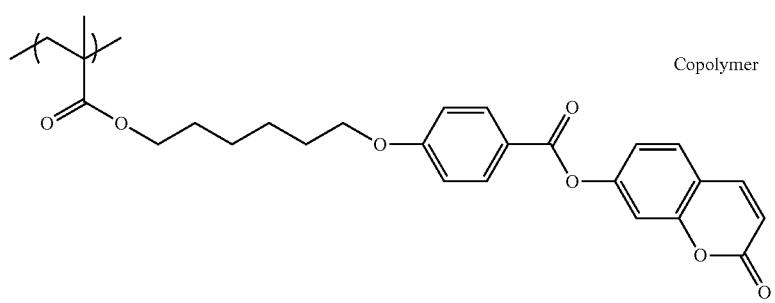
Copolymer
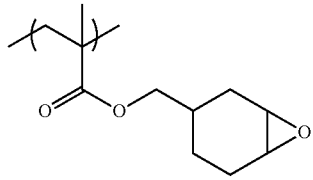
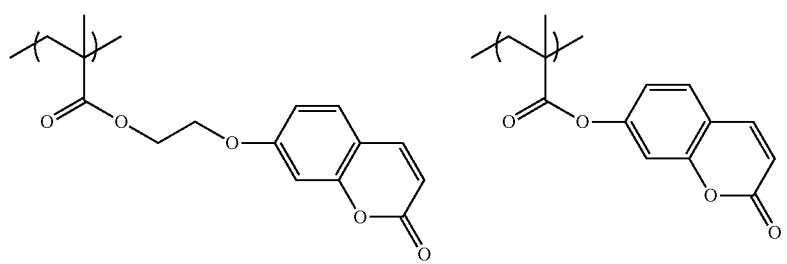

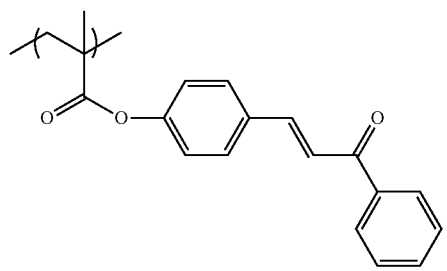
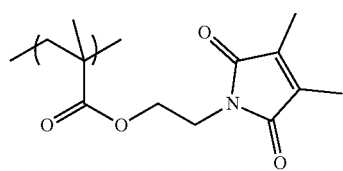 (1a-1)
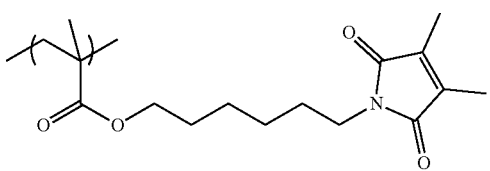 (1a-2)
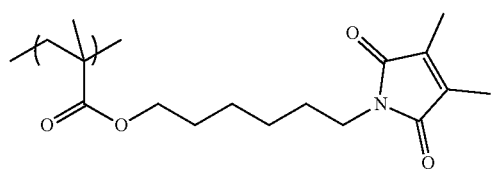 (1a-3)
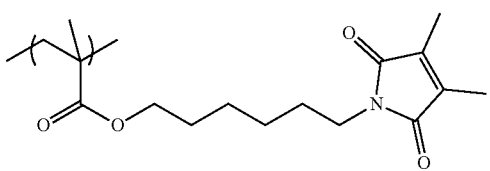 (1a-4)
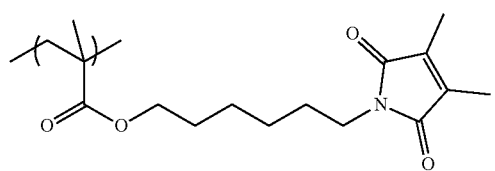 (1a-5)
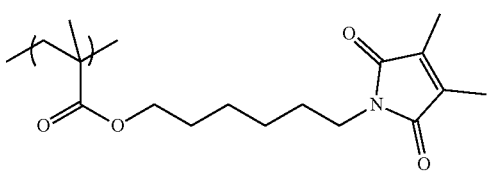 (1a-6)
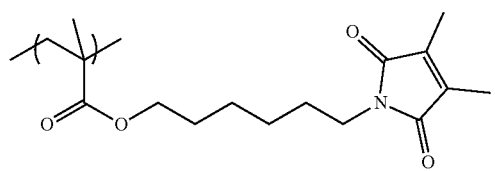 (1a-7)
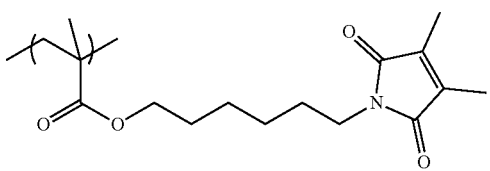 (1a-8)
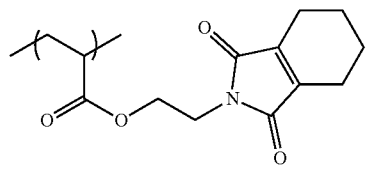 (1a-9)
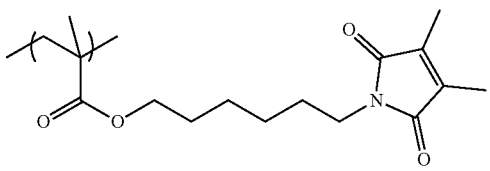 (1a-10)
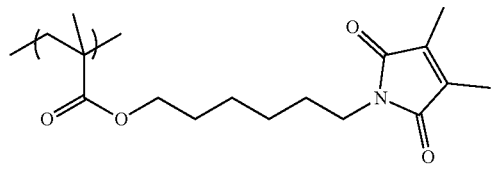 (1a-11)
Copolymer
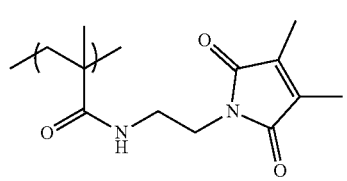 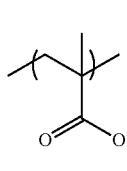 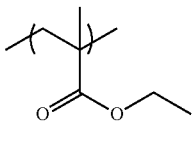

-continued
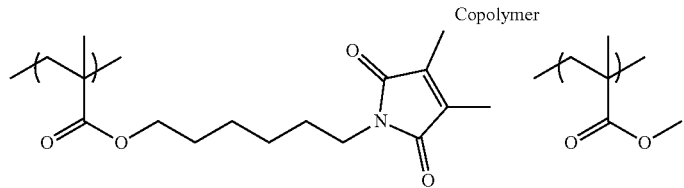
Copolymer
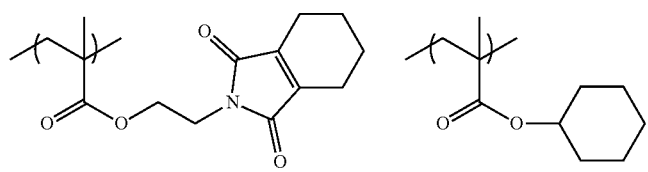
Copolymer
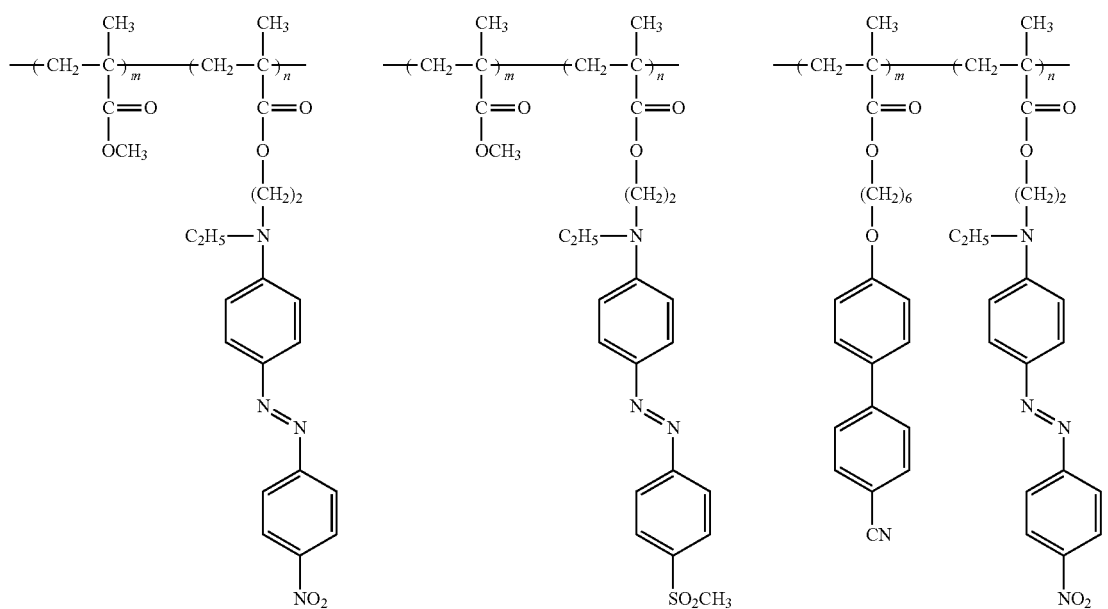
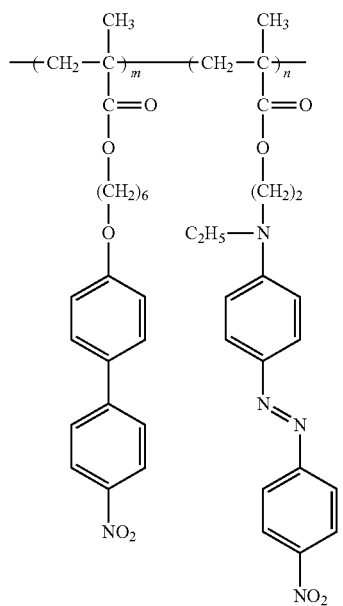

-continued
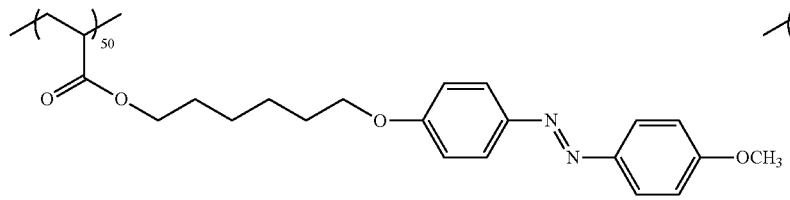
Copolymer
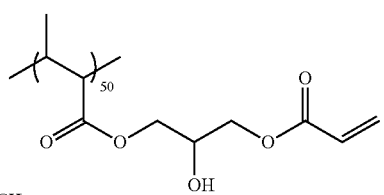
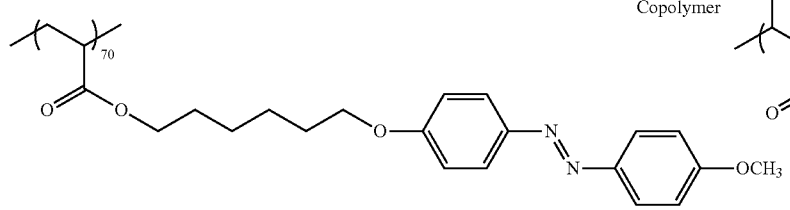
Copolymer
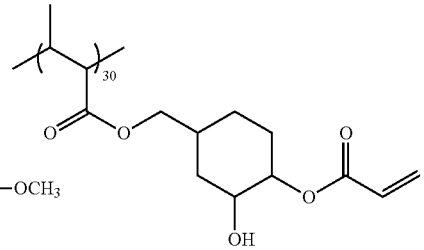
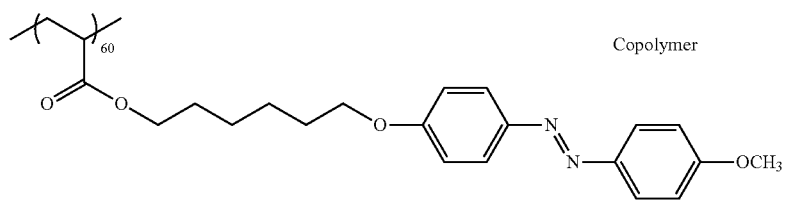
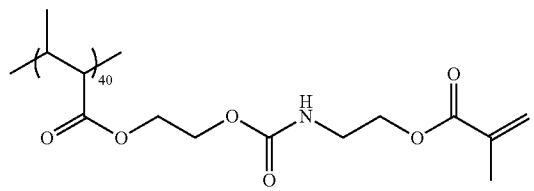
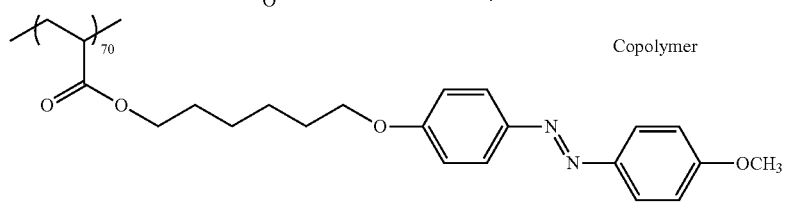
Copolymer
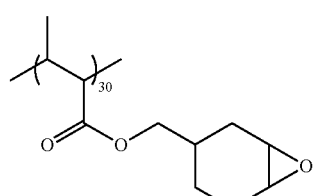
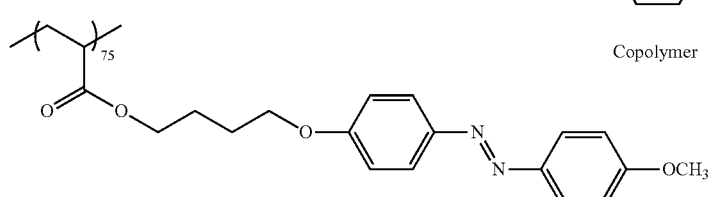
Copolymer
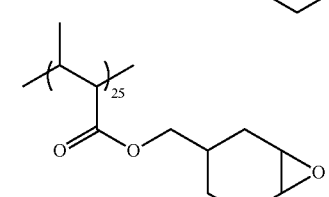
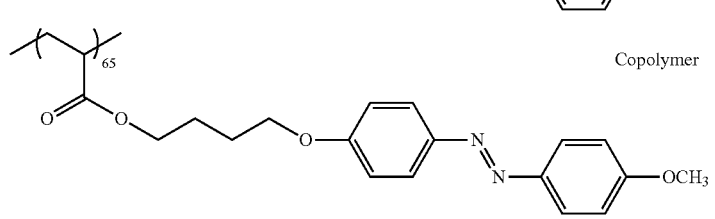
Copolymer
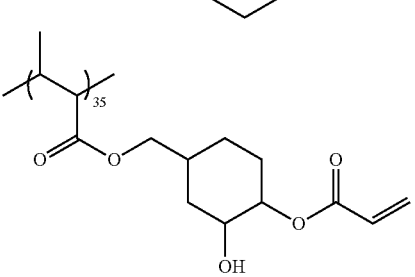
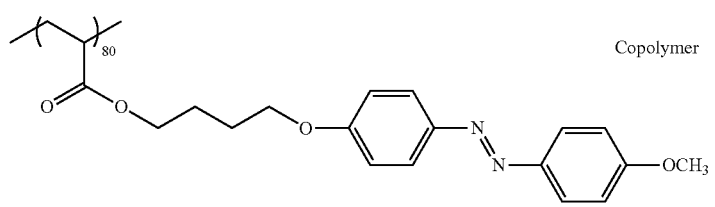
Copolymer
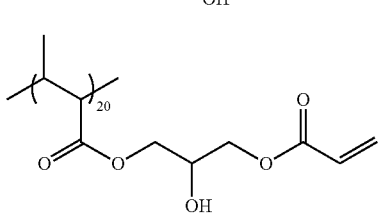

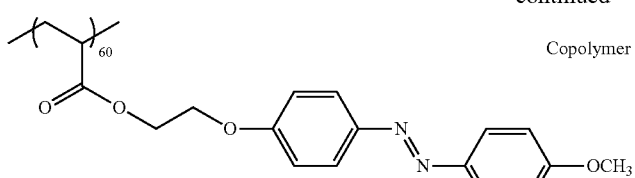
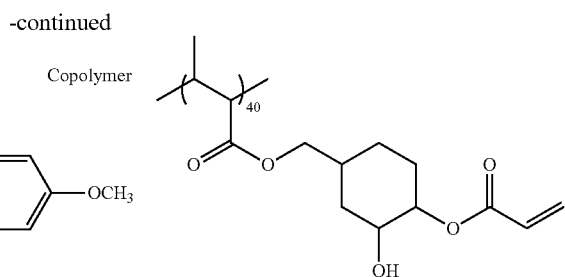

Copolymer

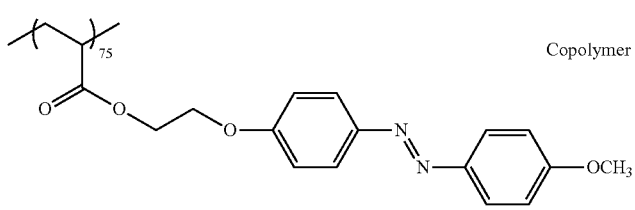
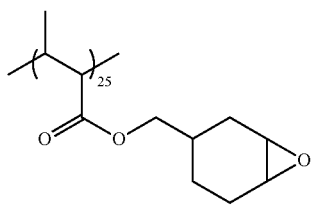

Copolymer

Preferable specific examples of the photo-sensitive polymer compound having a repeating unit represented by Formula (II) will be shown below, but the invention is not limited thereto.

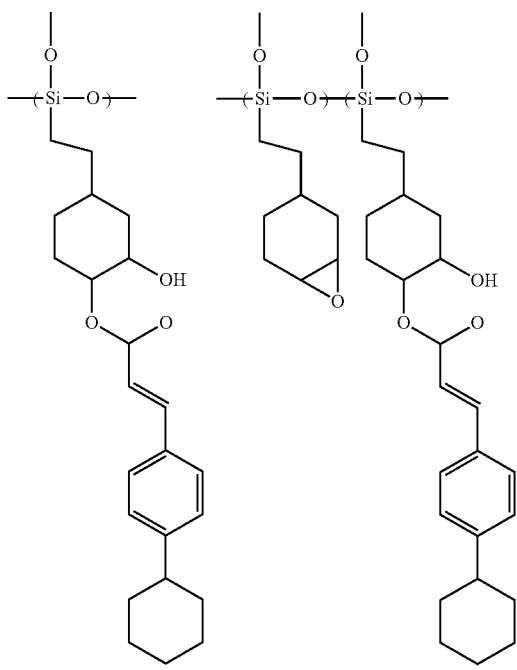
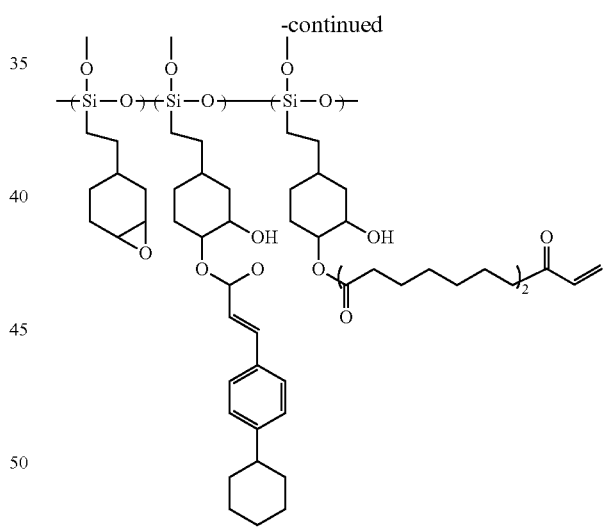

The photo-sensitive polymer compound having a repeating unit represented by Formula (I) or (II) may be synthesized by (a) directly introducing a photo-reactive group through polymerization of a corresponding monomer or (b) introducing a photo-reactive group into a polymer obtained by polymerizing a monomer having an arbitrary functional group by a polymer reaction. The above-sensitive polymer compound can also be synthesized by a combination of (a) and (b).

Here, examples of a polymerization reaction that can be used in (a) and (b) described above include radical polymerization, cationic polymerization, and anionic polymerization.

In addition, the photo-sensitive polymer compound having a repeating unit represented by Formula (I) or (II) may be a copolymer formed of a plurality of types of repeating units represented by Formula (I) or (II), or a copolymer including a repeating unit (for example, a repeating unit not including an ethylenically unsaturated group) other than those represented by Formula (I) or (II).

The molecular weight range of the photo-sensitive polymer compound is preferably 1,000 to 500,000, more preferably 2,000 to 300,000, and even more preferably 3,000 to 200,000 in terms of weight-average molecular weight.

Here, the weight-average molecular weight and the number-average molecular weight are defined as polystyrene (PS)-converted values obtained by gel permeation chromatography (GPC) measurement, and in the invention, the measurement by GPC can be performed using HLC-8220GPC (manufactured by TOSOH CORPORATION) and using TSKgel Super HZM-H, TSKgel Super HZ4000, and TSKgel Super HZ200 (manufactured by TOSOH CORPORATION) as columns.

In the invention, the content of the photo-alignment compound contained in the liquid crystal composition according to the embodiment of the invention is preferably 0.01 to 10 parts by mass, more preferably 0.02 to 8 parts by mass, and even more preferably 0.05 to 5 parts by mass with respect to 100 parts by mass of the above-described liquid crystal compound.

[Specific Polymer]

The specific polymer contained in the liquid crystal composition according to the embodiment of the invention is a polymer obtained by polymerizing a monomer having two or more radically polymerizable double bonds and one or more hydroxyl groups, and preferably a polymer obtained by polymerizing a monomer having two or more radically polymerizable double bonds and two or more hydroxyl groups.

The specific polymer is preferably a polymer obtained by polymerizing a monomer represented by Formula X.

$$Z^{X1}\text{-}L^{X1}\text{-}L^{X2}\text{-}(L^{X3}\text{-}L^{X4}\text{-}Z^{X2})_n \quad \text{Formula X}$$

In Formula X, $Z^{X1}$ and $Z^{X2}$ each independently represent a group having a radically polymerizable double bond, $L^{X1}$ and $L^{X4}$ each independently represent a single bond or an alkylene group having a hydroxyl group, $L^{X2}$ and $L^{X3}$ each independently represent a single bond, or a divalent linking group formed of at least one selected from the group consisting of —O—, —(C=O)O—, —O(C=O)—, a divalent chain group, an alkylene group having a hydroxyl group, and a divalent aliphatic cyclic group, at least one of $L^{X1}$, $L^{X2}$, $L^{X3}$, or $L^{X4}$ is an alkylene group having a hydroxyl group, M represents a single bond or a di- to tetra-valent linking group, and n represents an integer of 1 to 3.

<$Z^{X1}$ and $Z^{X2}$>

$Z^{X1}$ and $Z^{X2}$ each independently represent a group having a radically polymerizable double bond.

Here, specific examples of the group having a radically polymerizable double bond include Formulae Z1 to Z6.

In Formulae Z3 and Z4, $R^m$ represents a hydrogen atom or an alkyl group having 1 to 20 carbon atoms, and is preferably a hydrogen atom or an alkyl group having 1 to 7 carbon atoms, and more preferably a hydrogen atom or a methyl group.

Among Formulae Z1 to Z6, Formula Z1 or Z2 is preferable, and Formula Z1 is more preferable.

<$L_{X1}$ and $L^{X4}$>

$L^{X1}$ and $L^{X4}$ each independently represent a single bond or an alkylene group having a hydroxyl group.

Specific suitable examples of the alkylene group having a hydroxyl group include —CH$_2$CH(OH)CH$_2$— and —CH$_2$CH(CH$_2$OH)—, and —CH$_2$CH(OH)CH$_2$— is more preferable.

<$L^{X2}$ and $L^{X3}$>

$L^{X1}$ and $L^{X3}$ each independently represent a single bond, or a divalent linking group formed of at least one selected from the group consisting of —O—, —(C=O)O—, —O(C=O)—, a divalent chain group, an alkylene group having a hydroxyl group, and a divalent aliphatic cyclic group. The divalent chain group may be linear or branched.

Regarding each of $L^{X2}$ and $L^{X3}$, examples of preferable combinations will be shown below.

Preferable combinations of $L^{X2}$ will be shown below. In the following combinations, a bond on the left side is bonded to the $L^{X1}$ side, and a bond on the right side is bonded to the M side. In Lx25, n represents an integer of 2 to 12.

Lx21: —O-divalent chain group-
Lx22: —O-divalent aliphatic cyclic group-divalent chain group-
Lx23: —OC(=O)-divalent aliphatic cyclic group-
Lx24: -divalent aliphatic cyclic group-(C=O)O—
Lx25: —(O-divalent chain group)$_n$-
Lx26: —O-alkylene group having hydroxyl group- Preferable combinations of $L^{X3}$ will be shown below. In the following combinations, a bond on the left side is bonded to the M side, and a bond on the right side is bonded to the $L^{X4}$ side. In Lx35, n represents an integer of 2 to 12.

Lx31: -divalent chain group-O—
Lx32: -divalent chain group-divalent aliphatic cyclic group-O—
Lx33: -divalent aliphatic cyclic group-C(=O)O—
Lx34: —O(C=O)-divalent aliphatic cyclic group-
Lx35: -(divalent chain group-O—)$_n$—
Lx36: -alkylene group having hydroxyl group-O—

Examples of the divalent chain group include an alkylene group, a substituted alkylene group, an alkenylene group, a substituted alkenylene group, an alkynylene group, and a substituted alkynylene group. Among these, an alkylene group, a substituted alkylene group, an alkenylene group, and a substituted alkenylene group are preferable, and an alkylene group and an alkenylene group are more preferable.

The alkylene group may have a branch. The number of carbon atoms of the alkylene group is preferably 1 to 12, more preferably 2 to 10, and even more preferably 2 to 8.

The alkylene moiety of the substituted alkylene group is the same as the above-described alkylene group. Examples of the substituent include a halogen atom.

The alkenylene group may have a branch. The number of carbon atoms of the alkenylene group is preferably 2 to 12, more preferably 2 to 10, and even more preferably 2 to 8.

The alkenylene moiety of the substituted alkenylene group is the same as the above-described alkenylene group. Examples of the substituent include a halogen atom.

The alkynylene group may have a branch. The number of carbon atoms of the alkynylene group is preferably 2 to 12, more preferably 2 to 10, and even more preferably 2 to 8.

The alkynylene moiety of the substituted alkynylene group is the same as the above-described alkynylene group. Examples of the substituent include a halogen atom.

Specific examples of the divalent chain group include ethylene, trimethylene, propylene, tetramethylene, 2-methyl-tetramethylene, pentamethylene, hexamethylene, octamethylene, 2-butenylene, and 2-butynylene.

Specific suitable examples of the alkylene group having a hydroxyl group include —CH$_2$CH(OH)CH$_2$— and —CH$_2$CH(CH$_2$OH)—, and —CH$_2$CH(OH)CH$_2$— is more preferable.

The divalent aliphatic cyclic group is preferably a 5-, 6-, or 7-membered ring, more preferably a 5- or 6-membered ring, and even more preferably a 6-membered ring.

The ring contained in the divalent aliphatic cyclic group may be either an aliphatic ring or a saturated heterocyclic ring. Specific examples of the aliphatic ring include a cyclohexane ring, a cyclopentane ring, and a norbornene ring.

The divalent aliphatic cyclic group may have a substituent.

Specific examples of the substituent include a halogen atom, a cyano group, a nitro group, an alkyl group having 1 to 5 carbon atoms, a halogen-substituted alkyl group having 1 to 5 carbon atoms, an alkoxy group having 1 to 5 carbon atoms, an alkylthio group having 1 to 5 carbon atoms, an acyloxy group having 2 to 6 carbon atoms, an alkoxycarbonyl group having 2 to 6 carbon atoms, a carbamoyl group, an alkyl-substituted carbamoyl group having 2 to 6 carbon atoms, and an acylamino group having 2 to 6 carbon atoms. Among these, an alkyl group having 1 to 5 carbon atoms and a halogen-substituted alkyl group having 1 to 5 carbon atoms are preferable.

In Formula X, n represents an integer of 1 to 3. n is preferably 1 or 2, and more preferably 1.

In a case where n is 2 or 3, a plurality of $L^{X3}$'s may be the same or different. A plurality of $L^{X4}$'s may be the same or different. A plurality of $Z^{X2}$'s may be the same or different.

In Formula X, M represents a single bond or a di- to tetra-valent linking group.

In Formula X, in a case of n=1, M is a divalent linking group. In a case of n=2, M is a trivalent linking group, and in a case of n=3, M is a tetravalent linking group.

M is preferably a di- to tetra-valent chain group, a group having an aliphatic cyclic group, or a group having an aromatic ring. The di- to tetra-valent chain group represents a saturated hydrocarbon group having 2 to 4 bonds. The number of carbon atoms of the saturated hydrocarbon group is preferably 1 to 40, more preferably 1 to 20, and even more preferably 1 to 10. The saturated hydrocarbon group may be linear or branched.

Specific examples of the group having an aliphatic cyclic group include a cyclohexane ring, a cyclopentane ring, and a norbornene ring.

Specific examples of the group having an aromatic ring include a phenyl group and a naphthalene group.

In the invention, the polymer obtained by polymerizing a monomer represented by Formula X is preferably a polymer obtained by polymerizing a monomer represented by Formula X1, that is, a polymer represented by Formula PX1.

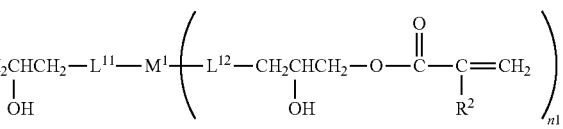

Formula X1

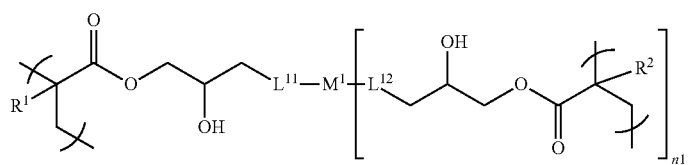

Formula PX1

In Formulae X1 and PX1, $R^1$ and $R^2$ each independently represent a hydrogen atom or an alkyl group having 1 to 20 carbon atoms, $L^{11}$ and $L^{12}$ each independently represent a single bond, or a divalent linking group formed of at least one selected from the group consisting of —O—, —(C=O) O—, —O(C=O)—, a divalent chain group, an alkylene group having a hydroxyl group, and a divalent aliphatic cyclic group, $M^1$ represents a single bond or a di- to tetra-valent linking group, and n1 represents an integer of 1 to 3.

Preferably, $R^1$ and $R^2$ each independently represent a hydrogen atom or an alkyl group having 1 to 12 carbon atoms, more preferably a hydrogen atom or an alkyl group having 1 to 6 carbon atoms, and even more preferably a hydrogen atom or a methyl group.

$L^{11}$ and $L^{12}$ each independently are the same as $L^{X2}$ and $L^{X3}$ in Formula X, and preferable combinations thereof are also the same as those of $L^{X2}$ and $L^{X3}$.

In a case where $M^1$ is a divalent linking group, a polymer obtained by polymerizing a monomer represented by Formula X2, that is, a polymer represented by Formula PX2 is preferable.

represents an alkyl group having 1 to 20 carbon atoms or an alkenyl group having 2 to 20 carbon atoms in which at least one carbon atom has a fluorine atom as a substituent.

$R^{a2}$ is preferably an alkyl group having 1 to 10 carbon atoms or an alkenyl group having 2 to 10 carbon atoms in which at least one carbon atom has a fluorine atom as a substituent, and more preferably an alkyl group having 1 to 10 carbon atoms in which at least one carbon atom has a fluorine atom as a substituent. It is even more preferable that half or more of the carbon atoms contained in $R^{a2}$ have a fluorine atom as a substituent.

The partial structure obtained by polymerizing a compound having a fluorine atom is more preferably a structure obtained by polymerizing a compound represented by Formula b, that is, a repeating unit represented by Formula Pb.

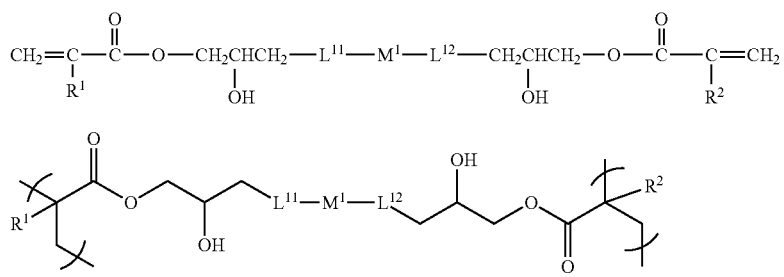

Formula X2

Formula PX2

Preferably, $R^1$ and $R^2$ each independently represent a hydrogen atom or a methyl group, and more preferably a hydrogen atom.

Preferably, $L^{11}$ and $L^{12}$ each independently represent *—O—**, *—O—CH$_2$—**, *—OCH(CH$_3$)—**, *—O—C$_2$H$_4$—**, *—O—C$_3$H$_6$—**, or *—OCH$_2$CH(OH)CH$_2$—**, and more preferably *—O—CH$_2$—**. * is bonded to the alkyl group side having a hydroxyl group in Formula X2, and ** is bonded to $M^1$.

$M^1$ is preferably a single bond, —C$_6$H$_{10}$—, —O(C=O)C$_6$H$_4$(C=O)O—, —O(C=O)C$_6$H$_{10}$(C=O)O—, or —O—C$_6$H$_4$—C(CH$_3$)(CH$_3$)—C$_6$H$_4$—O—.

In the invention, the specific polymer preferably has a partial structure obtained by polymerizing a compound having a fluorine atom.

Here, the partial structure obtained by polymerizing a compound having a fluorine atom is preferably a structure obtained by radically polymerizing a compound having a fluorine atom represented by Formula a, that is, a repeating unit represented by Formula Pa.

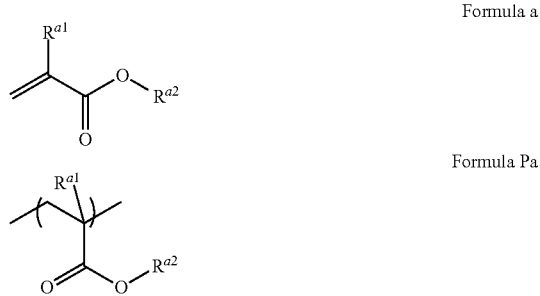

Formula a

Formula Pa

In Formulae a and Pa, $R^{a1}$ represents a hydrogen atom or an alkyl group having 1 to 20 carbon atoms, and $R^{a2}$

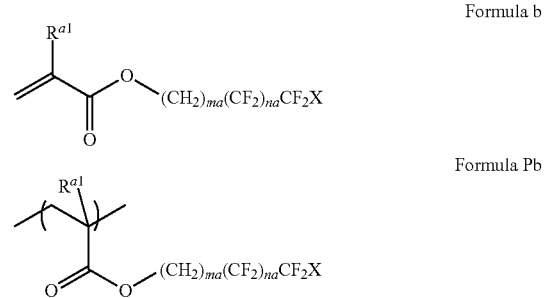

Formula b

Formula Pb

In Formulae b and Pb, $R^{a1}$ represents a hydrogen atom or an alkyl group having 1 to 20 carbon atoms, each of ma and na represents an integer of 0 or more, and X represents a hydrogen atom or a fluorine atom. ma is preferably an integer of 1 to 10, and na is preferably an integer of 4 to 12.

Specific examples of the compound represented by Formula b include 2,2,2-trifluoroethyl (meth)acrylate, 2,2,3,3,3-pentafluoropropyl (meth)acrylate, 2-(perfluorobutyl)ethyl (meth)acrylate, 2-(perfluorohexyl)ethyl (meth)acrylate, 2-(perfluorooctyl)ethyl (meth)acrylate, 2-(perfluorodecyl) ethyl (meth) acrylate, 2-(perfluoro-3-methylbutyl)ethyl (meth)acrylate, 2- (perfluoro-5-methylhexyl)ethyl (meth) acrylate, 2- (perfluoro-7-methyloctyl)ethyl (meth)acrylate, 1H,1H,3H-tetrafluoropropyl (meth) acrylate, 1H,1H,5H-octafluoropentyl (meth)acrylate, 1H,1H,7H-dodecafluoroheptyl (meth)acrylate, 1H,1H,9H-hexadecafluorononyl (meth) acrylate, 1H-1-(trifluoromethyl)trifluoroethyl (meth) acrylate, 1H,1H,3H-hexafluorobutyl (meth)acrylate, 3-perfluorobutyl-2-hydroxypropyl (meth)acrylate, 3-perfluorohexyl-2-hydroxypropyl (meth)acrylate, 3-perfluorooctyl-2-hydroxypropyl (meth)acrylate, 3-(perfluoro-3-methylbutyl)-2-hydroxypropyl (meth)acrylate, 3-(perfluoro- 5-methylhexyl)-2-hydroxypropyl (meth)acrylate, and 3-(perfluoro-7-methyloctyl)-2-hydroxypropyl (meth)acrylate.

The specific polymer is preferably obtained by copolymerizing the above-described compound having a fluorine atom.

In the specific polymer, a ratio of copolymerization of the compound having a fluorine atom is preferably 0.01 to 100 mol, more preferably 0.1 to 50 mol, and even more preferably 0.5 to 30 mol with respect to 1 mol of the monomer having two or more radically polymerizable double bonds and one or more hydroxyl groups from the viewpoint of reactivity and surface modification effect.

The specific polymer may have a partial structure derived from a compound having a siloxane bond. The structure derived from a compound having a siloxane bond may have a repeating unit represented by —Si($R^{a3}$)($R^{a4}$)O— and may constitute at least a part of the molecule.

The specific polymer is preferably a graft copolymer in which a polysiloxane structure is introduced into the side chain of the polymer.

In the compound having a siloxane bond, $R^{a2}$ in Formula a preferably includes —Si($R^{a3}$)($R^{a4}$)O—, and the compound more preferably has a structure obtained by polymerizing a compound represented by Formula c.

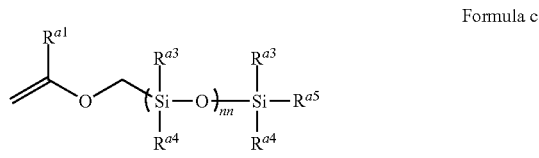

Formula c $R^{a3}$ and $R^{a4}$ each independently represent an alkyl group, a haloalkyl group, or an aryl group.

As the alkyl group, an alkyl group having 1 to 10 carbon atoms is preferable. Examples thereof include a methyl group, an ethyl group, and a hexyl group.

As the haloalkyl group, a fluorinated alkyl group having 1 to 10 carbon atoms is preferable. Examples thereof include a trifluoromethyl group and a pentafluoroethyl group.

As the aryl group, an aryl group having 6 to 20 carbon atoms is preferable. Examples thereof include a phenyl group and a naphthyl group.

Among these, each of $R^{a3}$ and $R^{a4}$ is preferably a methyl group, a trifluoromethyl group, or a phenyl group, and particularly preferably a methyl group.

$R^{a1}$ is the same as $R^{a1}$ in Formula a, and a preferable range thereof is also the same as that of $R^{a1}$ in Formula a.

$R^{a5}$ is preferably an alkyl group having 1 to 12 carbon atoms, and more preferably an alkyl group having 1 to 4 carbon atoms.

nn is preferably 10 to 1,000, more preferably 20 to 500, and even more preferably 30 to 200. The repeating unit may be formed of a single monomer or a plurality of monomers.

Examples of the compound having a siloxane bond for graft copolymerization include a polysiloxane macromer containing a (meth)acryloyl group at one terminal (for example, SILAPLANE 0721 and SILAPLANE 0725 (all product names, manufactured by Chisso Corporation), AK-5, AK-30, and AK-32 (all product names, manufactured by TOAGOSEI CO., LTD.), and KF-100T, X-22-169AS, KF-102, X-22-3701IE, X-22-164B, X-22-164C, X-22-5002, X-22-173B, X-22-174D, X-22-167B, and X-22-161AS (all product names, manufactured by Shin-Etsu Chemical Co., Ltd.)).

In the specific polymer, a ratio of copolymerization of the compound having a siloxane bond is preferably 0.1 to 50 mol, and particularly preferably 0.1 to 30 mol with respect to 1 mol of the monomer having two or more polymerizable groups and one or more hydroxyl groups from the viewpoint of reactivity and surface modification effect.

Examples of the compound represented by Formula X will be shown below. The invention is not limited thereto.

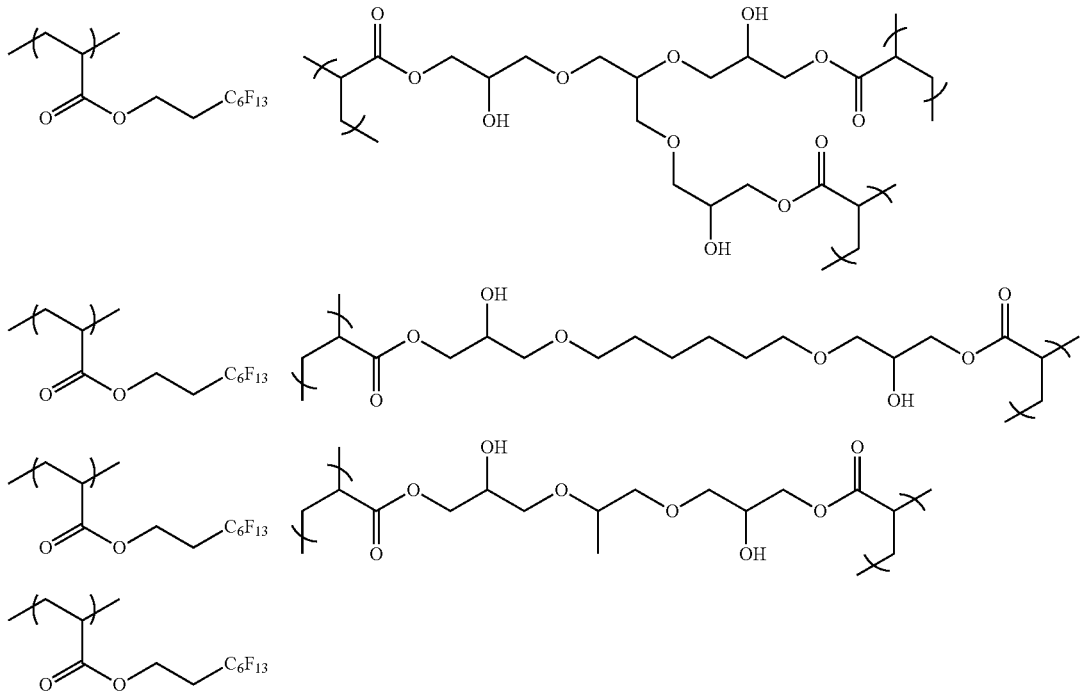

-continued
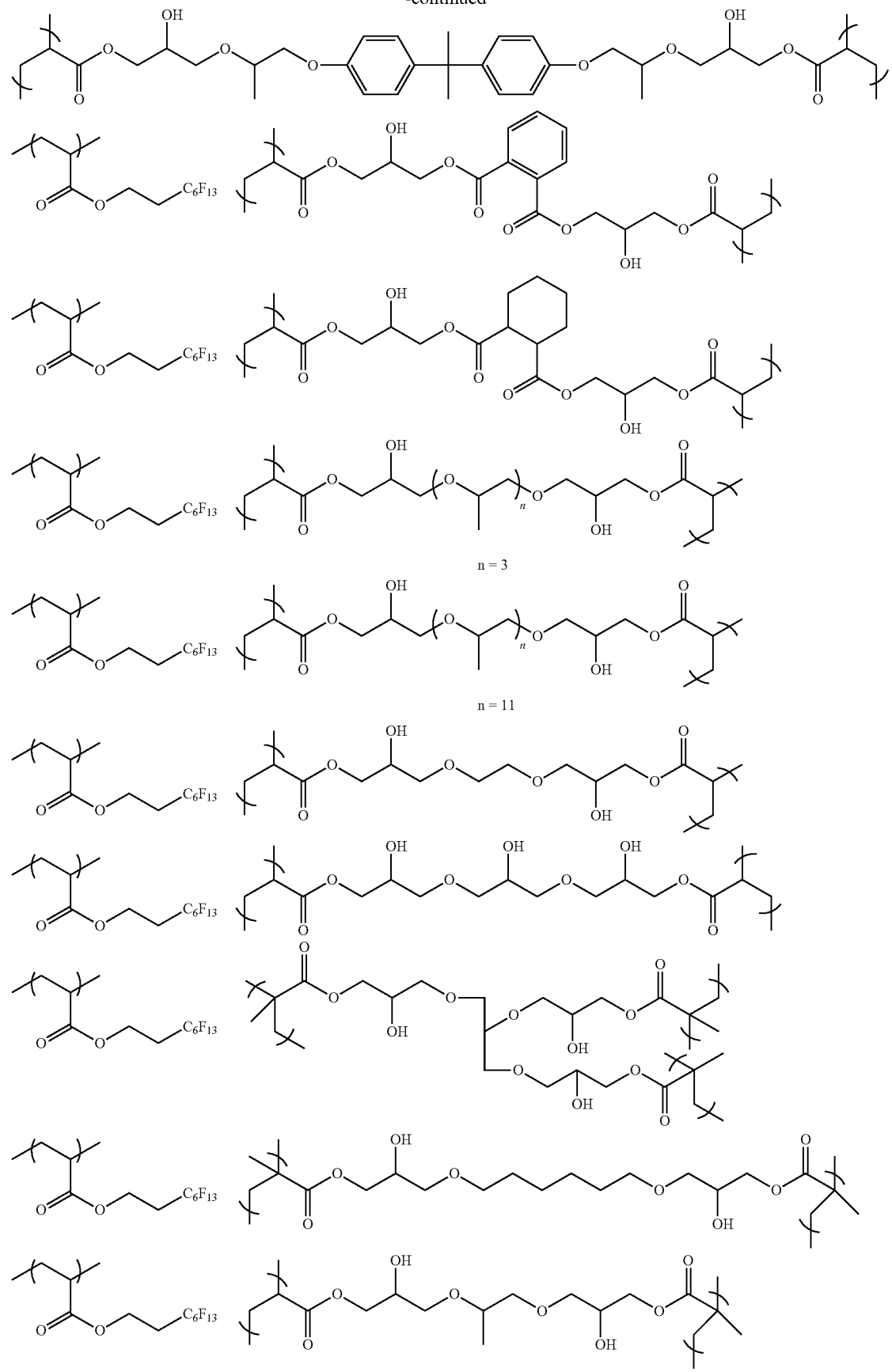

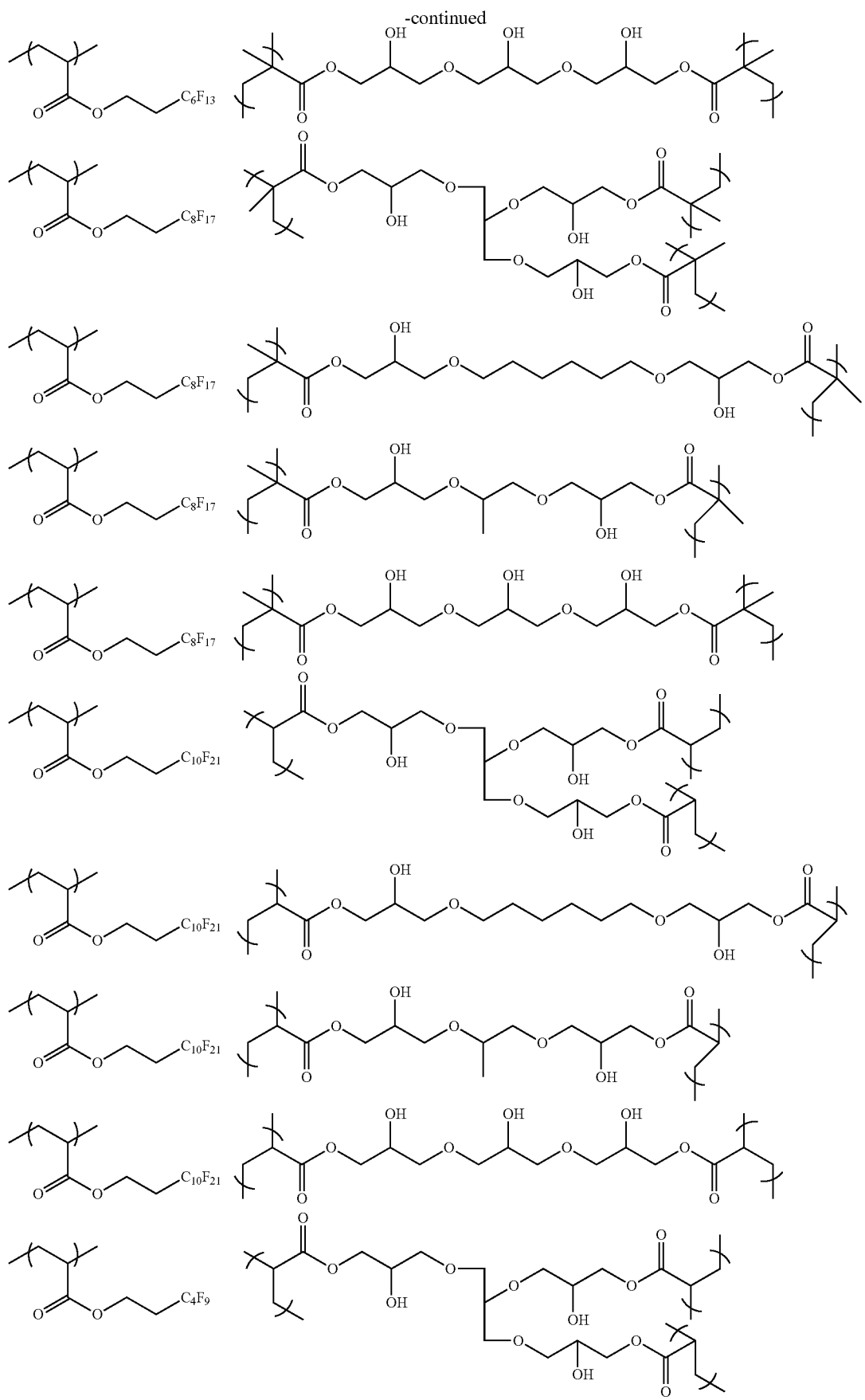

-continued
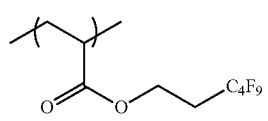
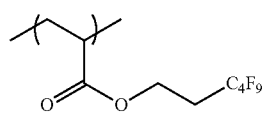
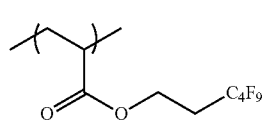
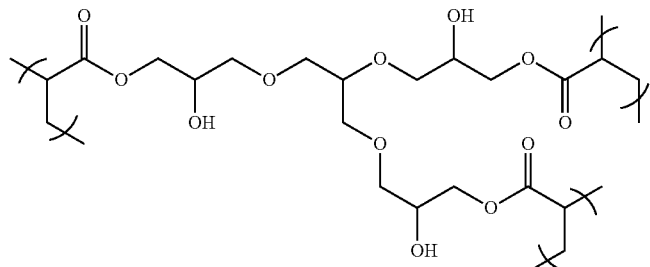
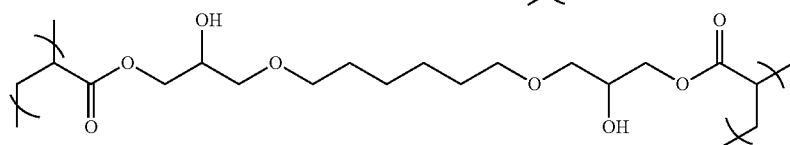
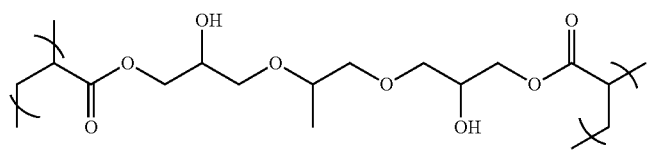
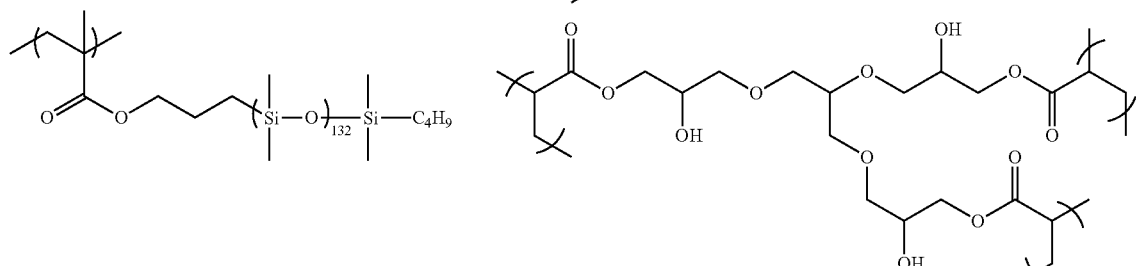
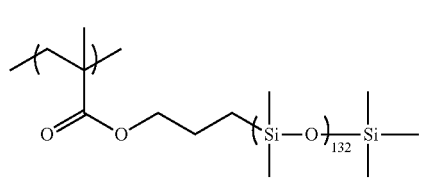
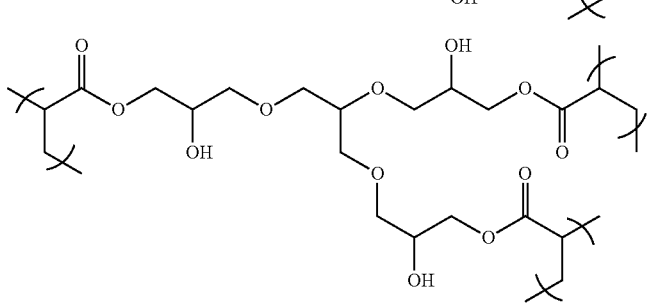
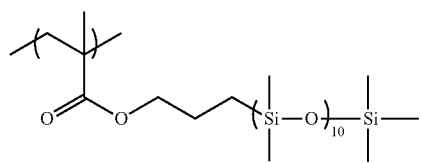
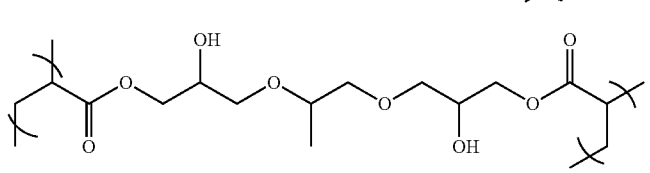

-continued

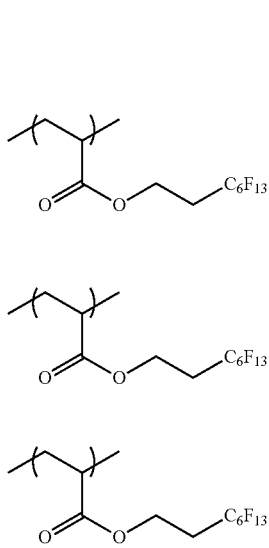
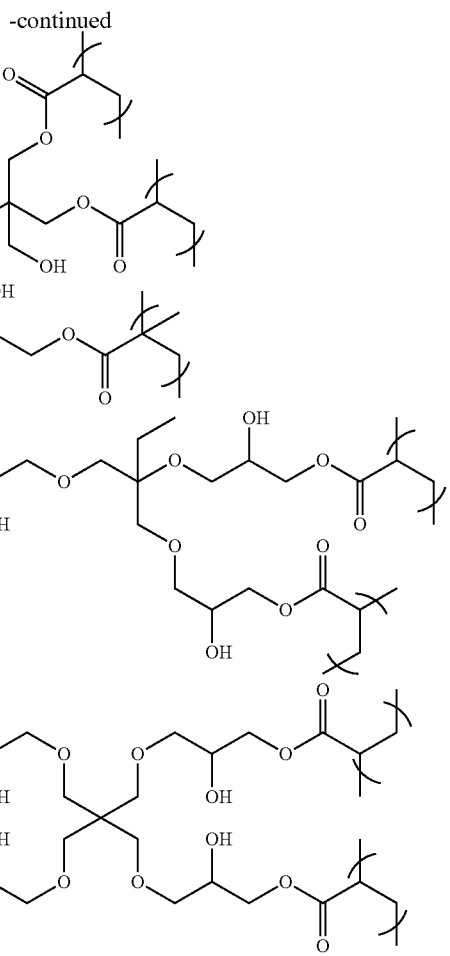

The molecular weight range of the specific polymer is preferably 1,000 to 30,000, more preferably 1,000 to 10,000, and even more preferably 1,000 to 8,000 in terms of weight-average molecular weight (Mw). The molecular weight range of the specific polymer is preferably 300 to 1,500, more preferably 400 to 1,200, and even more preferably 500 to 1,000 in terms of number-average molecular weight (Mn).

Here, the weight-average molecular weight and the number-average molecular weight are defined as polystyrene (PS)-converted values obtained by gel permeation chromatography (GPC) measurement, and in the invention, the measurement by GPC can be performed using HLC-8220GPC and using TSKgel Super HZM-H, TSKgel Super HZ4000, and TSKgel Super HZ200 (manufactured by TOSOH CORPORATION) as columns.

In the invention, the content of the specific polymer contained in the liquid crystal composition according to the embodiment of the invention is preferably 0.01 to 2 parts by mass, more preferably 0.02 to 1.6 parts by mass, and even more preferably 0.03 to 1 part by mass with respect to 100 parts by mass of the above-described liquid crystal compound.

[Polymerization Initiator]

The liquid crystal composition according to the embodiment of the invention preferably contains a polymerization initiator.

The polymerization initiator to be used is preferably a photopolymerization initiator capable of starting a polymerization reaction by ultraviolet irradiation.

Examples of the polymerization initiator include α-carbonyl compounds (described in U.S. Pat. Nos. 2,367,661A and 2,367,670A), acyloin ethers (described in U.S. Pat. No. 2,448,828A), α-hydrocarbon-substituted aromatic acyloin compounds (described in U.S. Pat. No. 2,722,512A), polynuclear quinone compounds (described in U.S. Pat. Nos. 3,046,127A and 2,951,758A), combinations of triarylimidazole dimer and p-aminophenyl ketone (described in U.S. Pat. No. 3,549,367A), acrydine and phenazine compounds (described in JP1985-105667A (JP-S60-105667A) and U.S. Pat. No. 4,239,850A), oxadiazole compounds (described in U.S. Pat. No. 4,212,970A), and acylphosphine oxide compounds (described in JP1988-040799B (JP-S63-040799B), JP1993-029234B (JP-H05-029234B), JP1998-095788A (JP-H10-095788A), and JP1998-029997A (JP-H10-029997A)).

The polymerization initiator is preferably 1 to 15 molar equivalents, more preferably 1 to 10 molar equivalents, and most preferably 2.0 to 10 molar equivalents with respect to 1 mol of the monomer having two or more radically polymerizable double bond and one or more hydroxyl groups.

[Solvent]

The liquid crystal composition according to the embodiment of the invention preferably contains a solvent from the viewpoint of workability or the like for forming an optically anisotropic layer.

Specific examples of the solvent include ketones (for example, acetone, 2-butanone, methyl isobutyl ketone, and cyclohexanone), ethers (for example, dioxane and tetrahydrofuran), aliphatic hydrocarbons (for example, hexane), alicyclic hydrocarbons (for example, cyclohexane), aromatic hydrocarbons (for example, toluene, xylene, and trimethylbenzene), halogenated hydrocarbons (for example, dichloromethane, dichloroethane, dichlorobenzene, and chlorotoluene), esters (for example, methyl acetate, ethyl acetate, and butyl acetate), water, alcohols (for example, ethanol, isopropanol, butanol, and cyclohexanol), cellosolves (for example, methyl cellosolve and ethyl cellosolve), cellosolve acetates, sulfoxides (for example, dimethyl sulfoxide), and amides (for example, dimethylformamide and dimethylacetamide). These may be used alone or in combination of two or more types thereof.

[Optically Anisotropic Layer]

An optically anisotropic layer according to the embodiment of the invention is an optically anisotropic film formed using the above-described liquid crystal composition according to the embodiment of the invention.

Examples of the method of forming an optically anisotropic film include a method including: setting a desired alignment state using the above-described liquid crystal composition according to the embodiment of the invention; and fixing by polymerization.

Here, in the invention, an optically anisotropic layer is formed using the above-described liquid crystal composition according to the embodiment of the invention. Accordingly, the liquid crystal compound can be aligned even under aging conditions of temperature lower than 80° C. (for example, 70° C.) and time shorter than 60 seconds (for example, 50 seconds), and thus it is possible to maintain an excellent plane state and aligning properties of an optically anisotropic layer to be produced.

The polymerization conditions are not particularly limited, and ultraviolet rays are preferably used in polymerization by light irradiation. The irradiation dose is preferably 10 mJ/cm$^2$ to 50 J/cm$^2$, more preferably 20 mJ/cm$^2$ to 5 J/cm$^2$, even more preferably 30 mJ/cm$^2$ to 3 J/cm$^2$, and particularly preferably 50 to 1,000 mJ/cm$^2$. In order to promote the polymerization reaction, the polymerization reaction may occur under heating conditions.

[Optical Laminate]

An optical laminate according to the embodiment of the invention is an optical laminate having a support and a first optically anisotropic layer (hereinafter, also abbreviated as "first optically anisotropic layer") provided on the support.

Here, in the optical laminate according to the embodiment of the invention, the first optically anisotropic layer is the above-described optically anisotropic layer according to the embodiment of the invention, that is, the optically anisotropic layer formed using the above-described liquid crystal composition according to the embodiment of the invention.

The optical laminate according to the embodiment of the invention preferably has a second optically anisotropic layer (hereinafter, also abbreviated as "second optically anisotropic layer") provided on the first optically anisotropic layer.

[Support]

Examples of the support of the optical laminate according to the embodiment of the invention include a polarizer and a polymer film. The support may be a combination thereof, such as a laminate of a polarizer and a polymer film or a laminate of a polymer film, a polarizer, and a polymer film.

The support may be a temporary support which is peelable after formation of the optically anisotropic layer (hereinafter, may be simply referred to as "temporary support"). Specifically, a polymer film functioning as a temporary support may be peeled off from the optical laminate to provide the optically anisotropic layer. For example, an optical laminate including an optically anisotropic layer and a temporary support may be prepared, the optically anisotropic layer side of the optical laminate may be bonded to a support including a polarizer with a pressure sensitive adhesive or an adhesive, and then the temporary support included in the optically anisotropic layer may be peeled off to provide a laminate of the support including a polarizer and the optically anisotropic layer.

<Polarizer>

In the invention, in a case where the optical laminate according to the invention is used in an image display device, at least a polarizer is preferably used as a support.

The polarizer is not particularly limited as long as it is a member functioning to convert light into specific linearly polarized light. An absorption-type polarizer or a reflection-type polarizer which has been known can be used.

As the absorption-type polarizer, an iodine-based polarizer, a dye-based polarizer using a dichroic dye, a polyene-based polarizer, or the like is used. The iodine-based polarizer and the dye-based polarizer include a coating-type polarizer and a stretching-type polarizer, and any of these may be applicable. A polarizer produced by adsorbing iodine or a dichroic dye to polyvinyl alcohol and performing stretching is preferable.

Examples of the method of obtaining a polarizer by performing stretching and dyeing in a state in which a lamination film is obtained by forming a polyvinyl alcohol layer on a base include JP5048120B, JP5143918B, JP5048120B, JP4691205B, JP4751481B, and JP4751486B. These known technologies concerning a polarizer can also be preferably used.

As the reflection-type polarizer, a polarizer obtained by laminating thin films having different birefringences, a wire grid-type polarizer, a polarizer obtained by combining a cholesteric liquid crystal having a selective reflection area and a ¼ wavelength plate, or the like is used.

Among these, a polarizer including a polyvinyl alcohol-based resin (that means a polymer including —$CH_2$—CHOH— as a repeating unit. Particularly, at least one selected from the group consisting of polyvinyl alcohol and ethylene-vinyl alcohol copolymer is preferable) is preferable in view of handleability.

In an aspect in which the optical laminate according to the invention includes a peelable support, a polarizing plate can be manufactured as follows.

The support is peeled off from the above-described optical laminate, and a layer including an optically anisotropic layer is laminated on a support including a polarizer. Otherwise, the above-described optical laminate is laminated on a support including a polarizer, and then the peelable support included in the optical laminate is peeled off. During the lamination, both layers may be adhered using an adhesive or the like. The adhesive is not particularly limited, and examples thereof include a curable adhesive of an epoxy compound including no aromatic ring in the molecule as shown in JP2004-245925A, an active energy ray-curable adhesive containing, as essential components, a photopolymerization initiator having a molar absorption coefficient of 400 or greater at a wavelength of 360 to 450 nm and an ultraviolet-curable compound as described in JP2008-174667A, and an active energy ray-curable adhesive containing (a) (meth)acrylic compound having two or more (meth)acryloyl groups in the molecule, (b) (meth)acrylic compound having a hydroxyl group in the molecule and having only one polymerizable double bond, and (c) phenol ethylene oxide-modified acrylate or nonyl phenol ethylene oxide-modified acrylate in a total amount of 100 parts by mass of a (meth)acrylic compound as described in JP2008-174667A.

The thickness of the polarizer is not particularly limited. The thickness is preferably 1 to 60 µm, more preferably 1 to 30 µm, and even more preferably 2 to 20 µm.

<Polymer Film>

The polymer film is not particularly limited, and a polymer film which is generally used (for example, polarizer protective film) can be used.

Specific examples of the polymer constituting the polymer film include cellulose-based polymers; acrylic polymers having an acrylic ester polymer such as polymethyl methacrylate and a lactone ring-containing polymer; thermoplastic norbornene-based polymers; polycarbonate-based polymers; polyester-based polymers such as polyethylene terephthalate and polyethylene naphthalate; styrene-based polymers such as polystyrene and an acrylonitrile-styrene copolymer (AS resin); polyolefin-based polymers such as polyethylene, polypropylene, and an ethylene-propylene copolymer; vinyl chloride-based polymers; amide-based polymers such as nylon and aromatic polyamide; imide-based polymers; sulfone-based polymers; polyether sulfone-based polymers; polyether ether ketone-based polymers; polyphenylene sulfide-based polymers; vinylidene chloride-based polymers; vinyl alcohol-based polymers; vinyl butyral-based polymers; arylate-based polymers; polyoxymethylene-based polymers; epoxy-based polymers; and polymers obtained by mixing these polymers.

Among these, cellulose-based polymers (hereinafter, also referred to as "cellulose acylate") represented by triacetyl cellulose can be preferably used.

From the viewpoint of workability and optical performance, acrylic polymers are also preferably used.

Examples of the acrylic polymers include polymethyl methacrylate and lactone ring-containing polymers described in paragraphs <0017> to <0107> of JP2009-098605A.

The thickness of the polymer film is not particularly limited, and preferably 40 µm or less since the thickness of the optical laminate can be reduced. The lower limit is not particularly limited, and generally 5 µm or greater.

In the invention, the thickness of the support is not particularly limited. The thickness is preferably 1 to 100 µm, more preferably 5 to 50 µm, and even more preferably 5 to 20 µm. In a case where the polarizer and the polymer film are all included, the thickness of the support refers to a total of thicknesses of the polarizer and the polymer film.

In an aspect in which a polymer film is used as the support which is peelable from the optical laminate, a cellulose-based polymer or a polyester-based polymer can be preferably used. The thickness of the polymer film is not particularly limited. The thickness is preferably 5 µm to 100 µm, and more preferably 20 µm to 90 µm due to handling during the manufacturing.

[First Optically Anisotropic Layer]

The first optically anisotropic layer of the optical laminate according to the embodiment of the invention is the above-described optically anisotropic layer according to the embodiment of the invention.

In the invention, the thickness of the first optically anisotropic layer is not particularly limited, and is preferably 0.1 to 10 µm, and more preferably 0.5 to 5 µm.

[Second Optically Anisotropic Layer]

The optional second optically anisotropic layer of the optical laminate according to the embodiment of the invention is not particularly limited as long as it is an optically anisotropic layer different from the first optically anisotropic layer, and a known optically anisotropic layer can be used.

The second optically anisotropic layer is preferably formed using a liquid crystal composition containing a liquid crystal compound. It is more preferable that the first optically anisotropic layer and the second optically anisotropic layer are formed to be in contact with each other without an alignment film provided therebetween.

Examples of the liquid crystal composition for forming the second optically anisotropic layer include a composition obtained by blending the polymerization initiator, the solvent, and optional additives (for example, a surfactant and an adhesion enhancing agent), except for the photo-alignment compound and the specific polymer of the liquid crystal composition according to the embodiment of the invention.

In the invention, the thickness of the second optically anisotropic layer is not particularly limited, and is preferably 0.1 to 10 µm, and more preferably 0.5 to 5 µm.

The method of forming a second optically anisotropic layer is not particularly limited. For example, a coating film may be formed by coating a liquid crystal composition on the above-described first optically anisotropic layer, and the obtained coating film may be subjected to a curing treatment (irradiation with ultraviolet rays (light irradiation treatment) or heating treatment) to form a second optically anisotropic layer.

The coating with the liquid crystal composition can be performed by a known method (for example, wire bar coating method, extrusion coating method, direct gravure coating method, reverse gravure coating method, or die coating method).

[Resin Layer]

The optical laminate according to the embodiment of the invention preferably has a resin layer between the support (particularly, temporary support) and the first optically anisotropic layer.

Such an optional resin layer is preferably a layer obtained by polymerizing and curing two or more types of polyfunctional monomers.

The polymerizable group contained in the polyfunctional monomer is more preferably a (meth)acryloyl group. At least one of the two or more types of polyfunctional monomers is preferably a monomer having a partial structure represented by Formula (X) (hereinafter, also referred to as "tricyclodecane skeleton"). Using a resin layer obtained by polymerizing and curing a monomer having a tricyclodecane skeleton represented by Formula (X) and a polyfunctional monomer, the adhesion with a temporary support to be described later can be reduced while maintaining film hardness of the resin layer, and thus the optically anisotropic layer can be easily transferred to a polarizer.

Hereinafter, raw materials of the resin layer will be described in detail, and procedures for manufacturing the resin layer will be described in detail.

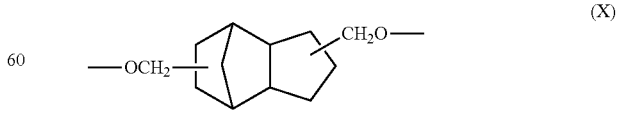

(X)

<Polyfunctional Monomer>

The polyfunctional monomer is a compound which can be polymerized using light or heat, and is a component constituting the resin layer by being polymerized and cured.

The number of polymerizable groups included in the polyfunctional monomer is not particularly limited and may be more than one (two or more). The number of polymerizable groups is preferably 3 to 32, and more preferably 3 to 20 in view of more excellent film hardness of the resin layer.

Specific examples of the polyfunctional monomer include polyfunctional (meth)acrylates such as ethylene glycol di(meth)acrylate, triethylene glycol di(meth)acrylate, tetramethylene glycol di(meth)acrylate, propylene glycol di(meth)acrylate, polyethylene glycol di(meth)acrylate, polypropylene glycol di(meth)acrylate, 1,3-butanediol di(meth)acrylate, trimethylol ethane triacrylate, trimethylol propane tri(meth)acrylate, trimethylol propane di(meth)acrylate, neopentyl glycol di(meth)acrylate, pentaerythritol tetra(meth)acrylate, pentaerythritol tri(meth)acrylate, pentaerythritol hexa(meth)acrylate, dipentaerythritol hexa(meth)acrylate, dipentaerythritol penta(meth)acrylate, 1,4-hexanediol (meth)acrylate, hexanediol di(meth)acrylate, trimethylol propane tri(acryloyloxypropyl)ether, tri(acryloyloxyethyl) isocyanurate, tri(acryloyloxyethyl) cyanurate, glycerin tri(meth)acrylate, or a compound obtained by performing (meth)acrylation after an addition reaction of an ethylene oxide or a propylene oxide with a polyfunctional alcohol such as trimethylol propane, or glycerin.

These polyfunctional monomers may be used alone or in combination of two or more types thereof.

The (meth)acrylate means acrylate or methacrylate.

A composition for forming the resin layer (hereinafter, also referred to as "resin layer forming composition") may contain a surfactant other than the polyfunctional monomer in view of the uniformity of the coating film and the hardness of the film.

The resin layer forming composition may contain an organic solvent. Examples of the organic solvent include those described in the above description of the liquid crystal composition according to the embodiment of the invention.

The resin layer forming composition may further contain an adhesion enhancing agent, a plasticizer, a polymer, or the like other than the above-described components.

The method of forming a resin layer is not particularly limited. For example, a coating film may be formed by coating with a resin layer forming composition, and the obtained coating film may be subjected to a curing treatment (irradiation with ultraviolet rays (light irradiation treatment) or heating treatment) to form a resin layer.

In the invention, the thickness of the resin layer is not particularly limited. The thickness is preferably 0.5 to 5 μm, and more preferably 0.5 to 2 μm.

[Image Display Device]

An image display device according to the invention is an image display device having the optical laminate according to the invention.

The display element which is used in the image display device according to the invention is not particularly limited, and examples thereof include a liquid crystal cell, an organic electroluminescence (hereinafter, electroluminescence "EL") display panel, and a plasma display panel.

Among these, a liquid crystal cell or an organic EL display panel is preferable, and a liquid crystal cell is more preferable. That is, the image display device according to the invention is preferably a liquid crystal display device using a liquid crystal cell as a display element or an organic EL display device using an organic EL display panel as a display element.

[Liquid Crystal Display Device]

A liquid crystal display device as an example of the image display device according to the invention is a liquid crystal display device having the above-described optical laminate according to the invention and a liquid crystal cell.

In the invention, the optical laminate according to the invention is preferably used as a front-side polarizing plate among polarizing plates provided on both sides of the liquid crystal cell.

Hereinafter, the liquid crystal cell constituting the liquid crystal display device will be described in detail.

<Liquid Crystal Cell>

The liquid crystal cell which is used in the liquid crystal display device is preferably a vertical alignment (VA) mode, an optically compensated bend (OCB) mode, an in-plane-switching (IPS) mode, or a twisted nematic (TN) mode, but is not limited thereto.

In a TN mode liquid crystal cell, rod-like liquid crystalline molecules (rod-like liquid crystal compound) are substantially horizontally aligned with no voltage application thereto, and subjected to twist alignment of 60° to 120°. The TN mode liquid crystal cell is the most frequently used as a color TFT liquid crystal display device, and there are descriptions in many literatures.

In a VA mode liquid crystal cell, rod-like liquid crystalline molecules are substantially vertically aligned with no voltage application thereto. The VA mode liquid crystal cell may be any one of (1) a VA mode liquid crystal cell in the narrow sense in which rod-like liquid crystalline molecules are substantially vertically aligned with no voltage application thereto, but are substantially horizontally aligned in the presence of voltage application thereto (described in JP1990-176625A (JP-H2-176625A)); (2) a (multi-domain vertical alignment (MVA) mode) liquid crystal cell attaining multi-domain of the VA mode for view angle enlargement (described in SID97, Digest of tech. Papers (proceedings) 28 (1997), 845), (3) an (n-axially symmetric aligned microcell (ASM) mode) liquid crystal cell in which rod-like liquid crystalline molecules are substantially vertically aligned with no voltage application thereto, but are subjected to twist multi-domain alignment in the presence of voltage application thereto (described in proceedings of Japan Liquid Crystal Debating Society, 58 to 59 (1998)), and (4) a super ranged viewing by vertical alignment (SURVIVAL) mode liquid crystal cell (published in liquid crystal display (LCD) International 98). In addition, the VA mode liquid crystal cell may be any one of a patterned vertical alignment (PVA) type, an optical alignment type, and a polymer-sustained alignment (PSA) type. The details of the modes are described in JP2006-215326A and JP2008-538819A.

In an IPS mode liquid crystal cell, rod-like liquid crystalline molecules are aligned to be substantially parallel to the substrate. The liquid crystalline molecules planarly respond by the application of an electric field parallel to a substrate surface. In the IPS mode, black display is performed during application of no electric field, and the absorption axes of a pair of upper and lower polarizing plates are perpendicular to each other. A method of improving a view angle by reducing light leakage at the time of black display in an oblique direction by using an optical compensation sheet is disclosed in JP1998-054982A (JP-H10-054982A), JP1999-202323A (JP-H11-202323A), JP1997-292522A (JP-H09-292522A), JP1999-133408A (JP-H11-133408A), JP1999-305217A (JP-H11-305217A), JP1998-307291A (JP-H10-307291A), and the like.

[Organic EL Display Device]

Suitable examples of the organic EL display device as an example of the image display device according to the embodiment of the invention include a device having an aspect it has the optical laminate according to the embodiment of the invention having a polarizer, a plate having a λ/4 function (hereinafter, also referred to as "λ/4 plate"), and an organic EL display panel in this order from the viewing side.

Here, the "plate having a λ/4 function" refers to a plate having a function of converting linearly polarized light of a specific wavelength into circularly polarized light (or converting circularly polarized light into linearly polarized light). For example, in an aspect in which the λ/4 plate has a single layer structure, specific examples thereof include a stretched polymer film and a retardation film in which an optically anisotropic film having a λ/4 function is provided on a support. In an aspect in which the λ/4 plate has a multilayer structure, specific examples thereof include a broadband λ/4 plate obtained by laminating a λ/4 plate and a λ/2 plate.

The organic EL display panel is a display panel configured using an organic EL element in which an organic light emitting layer (organic electroluminescent layer) is sandwiched between electrodes (between a cathode and an anode). The configuration of the organic EL display panel is not particularly limited, and a known configuration is employed.

EXAMPLES

Hereinafter, the invention will be more specifically described with examples. Materials, used amounts, ratios, treatment contents, treatment procedures, and the like of the following examples are able to be suitably changed unless the changes cause deviance from the gist of the invention. Therefore, the range of the invention will not be restrictively interpreted by the following examples.

[Laminate]

Synthesis Example 1

Synthesis of Polymer B-101

25.0 g of t-amyl alcohol was put into a 200 mL three-necked flask comprising a stirrer, a thermometer, a reflux cooling pipe, and a nitrogen gas introduction pipe, and the temperature was increased to 120° C.

Next, a mixed solution consisting of 3.25 g (7.8 mmol) of 2-(perfluorohexyl)ethyl acrylate, 2.26 g (4.7 mmol) of a trifunctional hydroxyl group-containing compound as the following monomer A, 25.0 g of t-amyl alcohol, and 6.0 g of a polymerization initiator "V-601" (manufactured by Wako Pure Chemical Industries, Ltd.) was added dropwise at a constant speed such that the dropwise addition was completed in 30 minutes.

After completion of the dropwise addition, stirring was continued for 3.5 hours, the solvent was distilled off under reduced pressure, and the mixture was dried at 130° C. under reduced pressure to obtain 7.7 g of a specific polymer B-101 to be shown below.

The weight-average molecular weight (Mw) of the obtained specific polymer B-101 was 1,800, the number-average molecular weight (Mn) was 500, and Mw/Mn was 3.77.

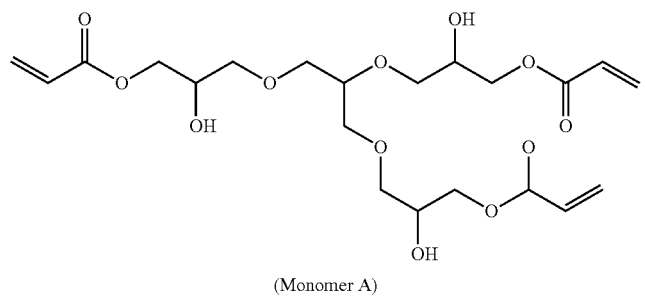

(Monomer A)

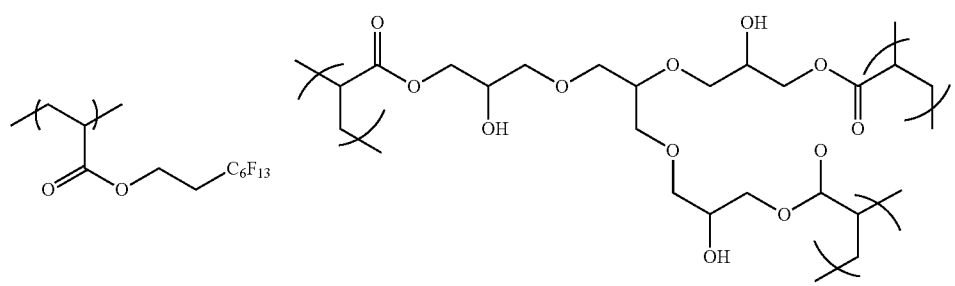

(Specific Polymer B-101)

Synthesis Examples 2 to 10

Synthesis of Polymers B-102 to B-110

Specific polymers B-102 to B-110 were synthesized in the same manner as in Synthesis Example 1, except that the monomer types and the amounts of the monomers and the polymerization initiators to be blended were changed to the types and values shown in the following Table 1.

Weight-average molecular weights (Mw), number-average molecular weights (Mn), and Mw/Mn of the synthesized specific polymers B-102 to B-110 will be shown in the following Table 1.

Structural formulae of monomers B, C, and D used in Synthesis Examples 2 to 10 will be shown below.

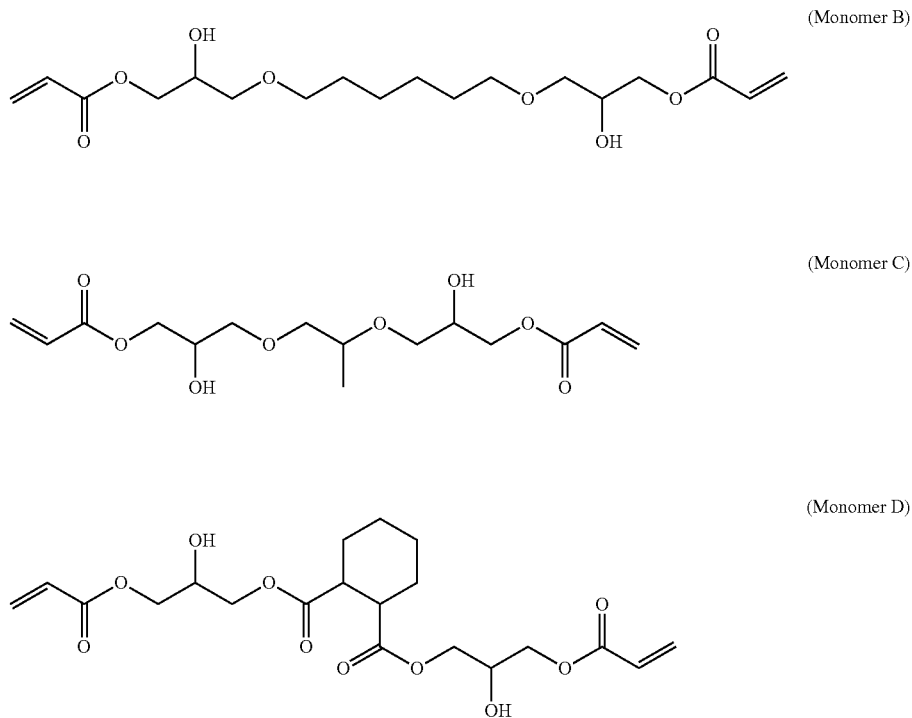

(Monomer B)

(Monomer C)

(Monomer D)

TABLE 1

| Specific Polymer | Hydroxyl Group-Containing Monomer Type | Parts by Mass | Fluorine-Containing Monomer Type | Parts by Mass | Polymerization Initiator Type | Amount* [eq. (mol)] | Mw | Mn | Mw/Mn |
|---|---|---|---|---|---|---|---|---|---|
| B-101 | A | 41 | C6FA | 59 | V-601 | 4.3 | 1800 | 500 | 3.77 |
| B-102 | B | 41 | C6FA | 59 | V-601 | 3.4 | 1800 | 700 | 2.68 |
| B-103 | C | 41 | C6FA | 59 | V-601 | 3.0 | 1500 | 500 | 2.90 |
| B-104 | D | 24 | C10FA | 76 | V-601 | 6.9 | 1600 | 500 | 3.24 |
| B-105 | A | 50 | C6FA | 50 | V-601 | 2.5 | 1500 | 600 | 2.69 |
| B-106 | C | 44 | C8FA | 56 | V-601 | 2.8 | 1900 | 600 | 3.19 |
| B-107 | B | 50 | C8FA | 50 | V-601 | 2.8 | 2100 | 700 | 3.01 |
| B-108 | D | 30 | C6FA | 70 | V-601 | 5.2 | 1600 | 700 | 2.29 |
| B-109 | A | 100 | — | 0 | V-601 | 9.2 | 3600 | 900 | 4.12 |
| B-110 | A | 80 | C6FHA | 20 | V-601 | 2.0 | 3100 | 700 | 4.44 |

*equivalents with respect to the monomer

Abbreviations in the above Table 1 have the following meanings, respectively.

C6FHA: 1H,1H,7H-dodecafluoroheptyl acrylate
C6FA: 2-(perfluorohexyl)ethyl acrylate
C8FA: 2-(perfluorooctyl)ethyl acrylate
C10FA: 2-(perfluorodecyl)ethyl acrylate Comparative Synthesis Example 1

Synthesis of Comparative Polymer H-101

25.0 g of toluene was put into a 200 mL three-necked flask comprising a stirrer, a thermometer, a reflux cooling pipe, and a nitrogen gas introduction pipe, and the temperature was increased to 120° C.

Next, a mixed solution consisting of 3.25 g (7.8 mmol) of 2-(perfluorohexyl)ethyl acrylate, 2.26 g (5.3 mmol) of trimethylolpropane triacrylate, 25.0 g of toluene, and 4.7 g of a polymerization initiator "V-601" (manufactured by Wako Pure Chemical Industries, Ltd.) was added dropwise at a constant speed such that the dropwise addition was completed in 30 minutes.

After completion of the dropwise addition, stirring was continued for 3.5 hours, the solvent was distilled off under reduced pressure, and the mixture was dried at 130° C. under reduced pressure to obtain 7.5 g of a comparative example polymer H-101 represented by the following formula.

The weight-average molecular weight (Mw) of the obtained comparative example polymer H-101 was 1,500.

Comparative Example Polymer H-101

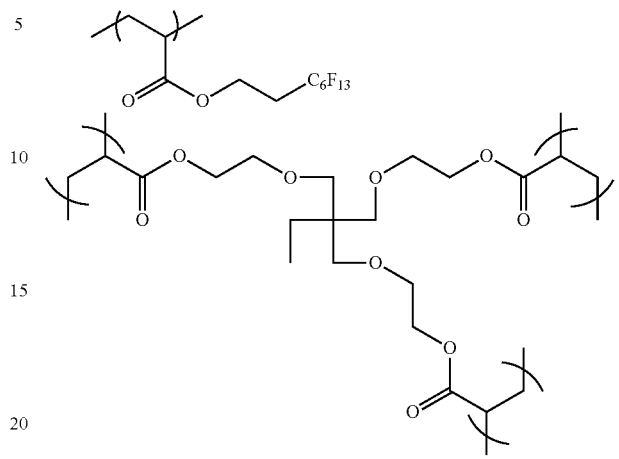

Photo-Alignment Compound

Synthesis Example 1

<Monomer M-1>
A cinnamic acid derivative compound M-1 represented by the following formula was obtained by a synthesis method of paragraphs <0069> to <0073> of JP2012-027354A.

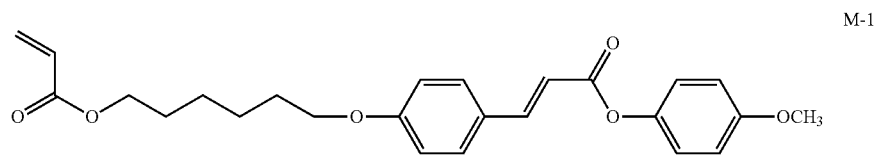 [SMILES: C=CC(=O)OCCCCCCOc1ccc(/C=C/C(=O)Oc2ccc(OC)cc2)cc1]

M-1

<Synthesis of Photo-Sensitive Polymer Compound PA1>
5.0 g of tetrahydrofuran (THF) was put into a 100 mL three-necked flask comprising a stirrer, a thermometer, a reflux cooling pipe, and a nitrogen gas introduction pipe, and the temperature was increased to 80° C.

Next, a mixed solution consisting of 4.0 g (9.4 mmol) of the compound (M-1), 1.0 g (5.1 mmol) of CYCLOMER M-100 (manufactured by Daicel Corporation), 10.0 g of THF, and 0.1 g (0.43 mmol) of a polymerization initiator "V-601" (manufactured by Wako Pure Chemical Industries, Ltd.) was added dropwise at a constant speed such that the dropwise addition was completed in 3 hours.

After completion of the dropwise addition, the mixture was stirred for 1 hour, and then a solution consisting of 0.025 g of a polymerization initiator "V-601" and 0.25 g of THF was added thereto. After stirring was continued for 4 hours, the reaction liquid was poured into 300 ml of methanol, and the mixture was dried to obtain 4.0 g of a photo-sensitive polymer compound PA1 represented by the following formula. The weight-average molecular weight (Mw) of the obtained photo-sensitive polymer compound PA1 was 11,200.

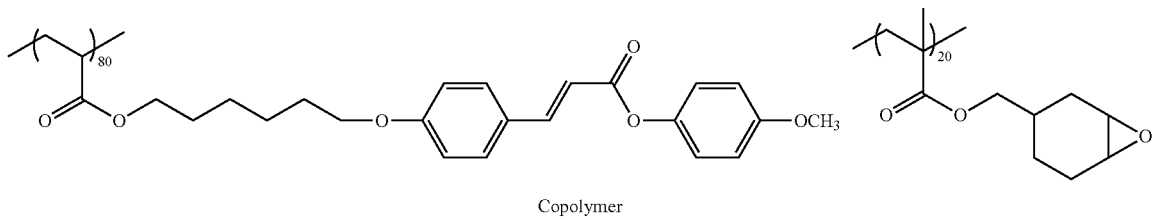

PA1

Copolymer

Synthesis Example 2

Synthesis of Photo-Sensitive Polymer Compound PA2

0.30 g (4.16 mmol) of acrylic acid, 0.036 g (0.14 mmol) of triphenylphosphine, and 0.01 g of p-methoxyphenol were added to 10.0 g of a THF solution of the photo-sensitive polymer compound PA1 obtained as above (solid content of polymer: 4.0 g) at room temperature (23° C.).

Next, the mixture was heated to 120° C. After 30 hours, the reaction liquid was cooled, and 4.0 g of a photo-sensitive polymer compound PA2 represented by the following formula was obtained. The weight-average molecular weight (Mw) of the obtained photo-sensitive polymer compound PA2 was 12,800.

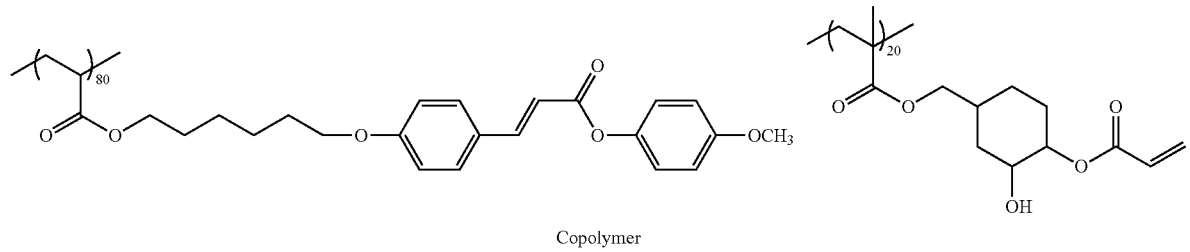

PA2

Copolymer

Synthesis Examples 3 to 6

<Monomer M-2>

A coumarin derivative compound M-2 represented by the following formula was obtained by synthesis performed in the same manner as in a method described in Chem. Mater., Vol. 13, No. 2, 2001, 694-703.

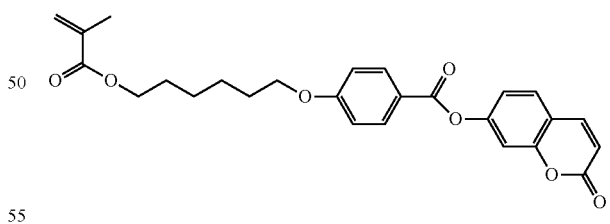

M-2

Synthesis of Photo-Sensitive Polymer Compounds PA3 to PA6

Photo-sensitive polymer compounds PA3 to PA6 were obtained by synthesis performed in the same manner as in the case of the photo-sensitive polymer compound PA1 or PA2 described above, except that the types and amounts of the monomers used were changed, and the types and compositional ratios of the repeating units in the obtained copolymers were as shown in the photo-sensitive polymer-compounds PA3 to PA6 represented by the following formulae. Mw of each of the obtained photo-sensitive polymer compounds PA3 to PA6 is shown in the following Table 2.

The monomers used for the synthesis of the photo-sensitive polymer compounds PA5 and PA6 were prepared in the same manner as in the case of the cinnamic acid derivative compound M-1 described above by changing the raw materials.

mmol) of 35% hydrochloric acid was added dropwise at room temperature while the reaction liquid was stirred vigorously.

Thereafter, the precipitated solid was collected by filtering and recrystallized with 100 g of ethyl acetate. 11.5 g (35 mmol) of alcohol was recovered as a red solid, and its structure was confirmed by nuclear magnetic resonance (NMR). The yield was 80.5%.

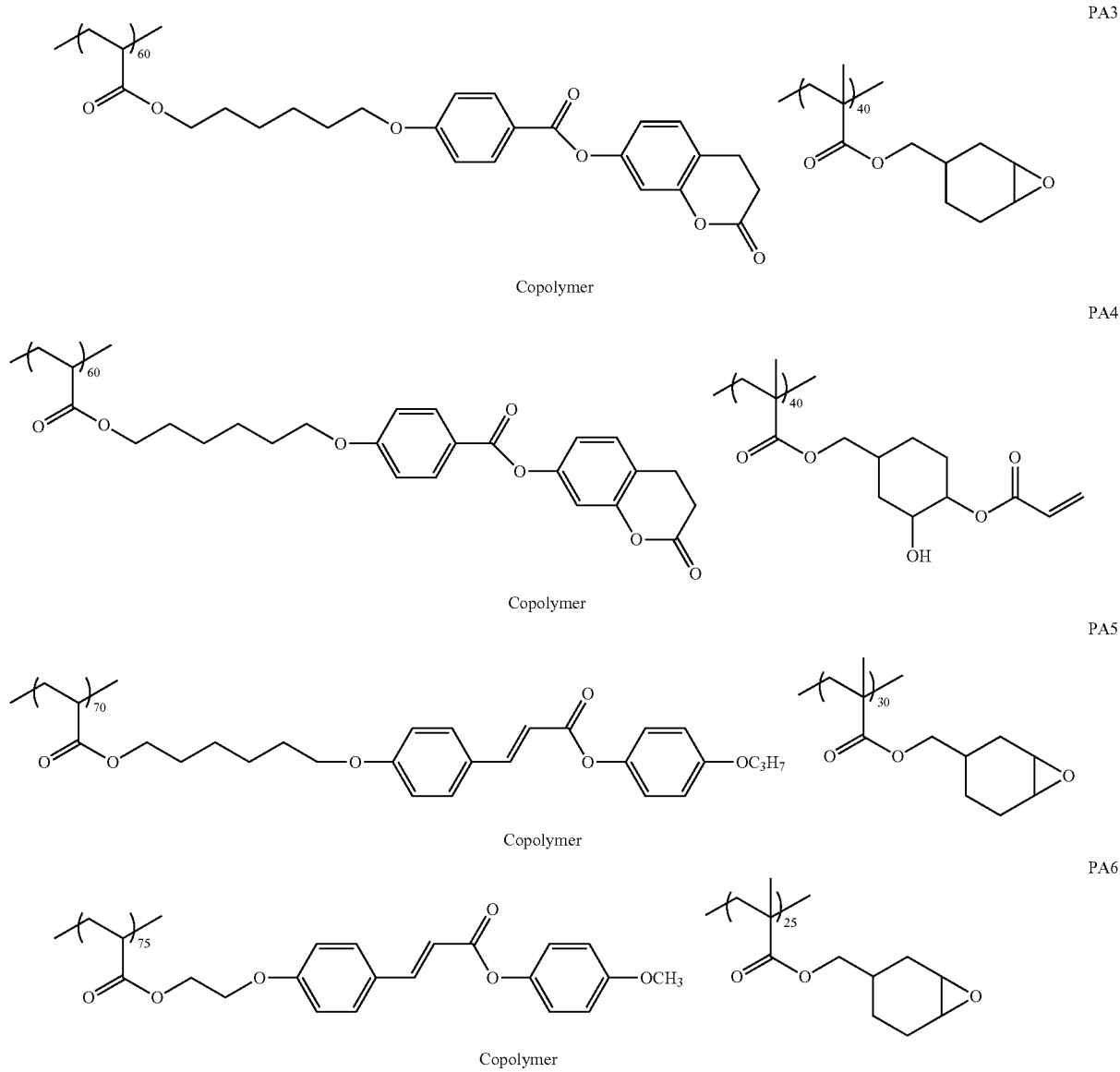

Synthesis Example 7

<Monomer M-3>

10.0 g (44 mmol) of 4-methoxyphenylazophenol and 6.7 g (48 mmol) of potassium carbonate were dissolved in 40 g of water.

To the resulting solution, 6.3 g (46 mmol) of 6-chlorohexanol was added dropwise for 1 hour.

Next, heating and refluxing were performed at 100° C. After 20 hours, the reaction liquid was cooled, and 5.5 g (53

10.0 g (30 mmol) of the obtained alcohol and 4.1 g (40 mmol) of triethylamine were dissolved in 40 g of THF.

To the resulting solution, 3.0 g (34 mmol) of acrylic acid chloride was added dropwise for 1 hour.

The solution was then heated to 40° C. After 4 hours, the reaction liquid was cooled, and 30 g of water was added thereto.

16 g (44 mmol) of 10% hydrochloric acid was added to the separated organic layer, and stirring was performed.

Then, the separated organic layer was concentrated, and the residue was recrystallized with 30.0 g of toluene. 11.0 g (28 mmol) of the monomer (1-(4-methoxyphenylazo)-4-[6-(acryloyloxy)hexyloxy]benzene) M-3 represented by the following formula was recovered as orange crystal, and its structure was confirmed by NMR. The yield was 91.1%.

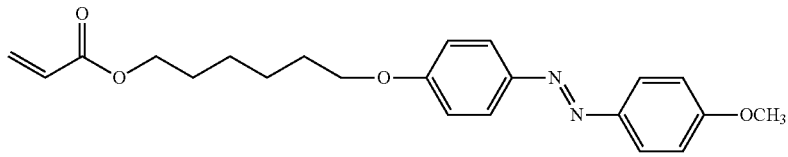

M-3

Synthesis of Photo-Sensitive Polymer Compound PA7

11.7 g (30 mmol) of 1-(4-methoxyphenylazo)-4-[6-(acryloyloxy)hexyloxy]benzene, 4.2 g (30 mmol) of glycidyl methacrylate, and 0.3 g (2 mmol) of 2,2'-azobisisobutyronitrile were dissolved in 47 g of cyclopentanone. The resulting solution was aerated with nitrogen for 1 hour.

Next, the solution was heated to 80° C. After 10 hours, the reaction liquid was cooled, and 2.1 g (30 mmol) of acrylic acid and 0.2 g (1 mmol) of triphenylphosphine were added at room temperature.

Next, the solution was heated to 120° C. After 30 hours, the reaction liquid was cooled, and 64 g of a photo-sensitive polymer compound PA7 represented by the following formula was obtained. The weight-average molecular weight (Mw) of the obtained photo-sensitive polymer compound PA7 was 40,200.

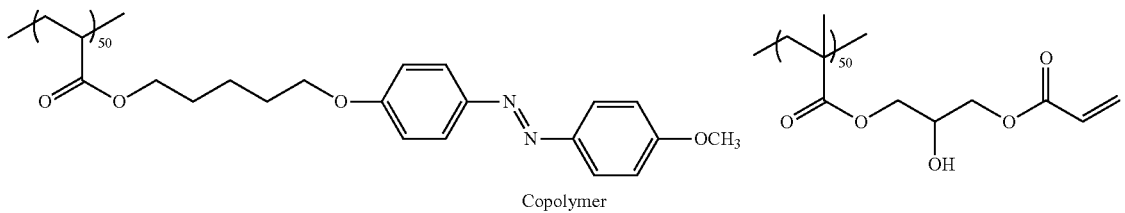

Copolymer

PA7

Synthesis Examples 8 to 11

Synthesis of Photo-Sensitive Polymer Compounds PA8 to P11

Photo-sensitive polymer compounds PA8 to PA11 represented by the following formulae were obtained by changing the addition amounts and types of the epoxy group-containing monomer and the azo-based derivative in the synthesis of the photo-sensitive polymer compound PA7. Mw of each of the obtained photo-sensitive polymer compounds PA8 to PA11 is shown in the following Table 2.

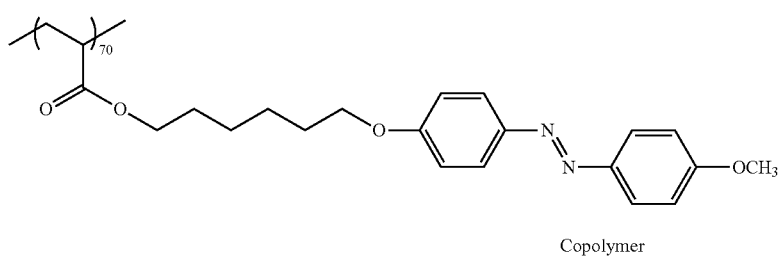

PA8

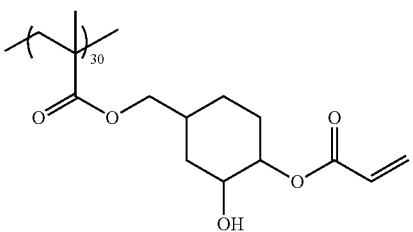

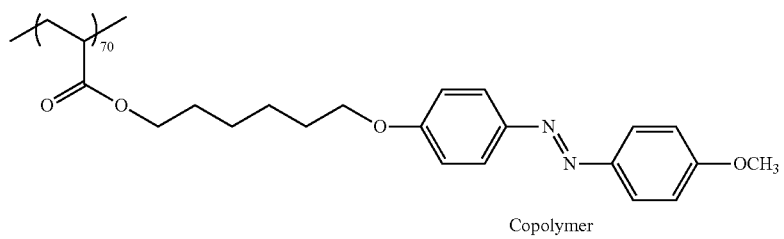

PA9

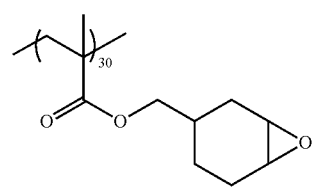

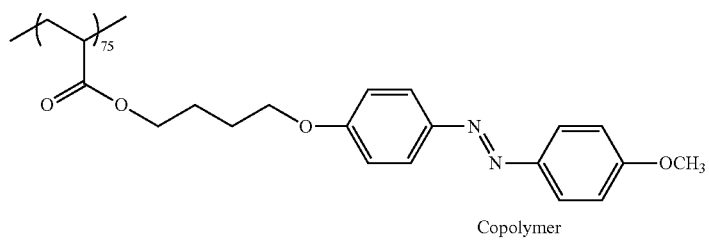

PA10

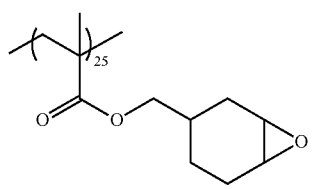

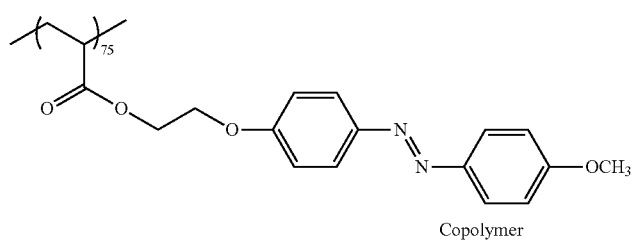

PA11

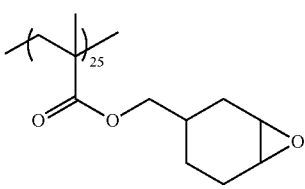

[Crosslinking Agent C1]

A crosslinking agent C1 (DENACOL EX411, manufactured by Nagase ChemteX Corporation) represented by the following formula was used.

[Crosslinking Assistant]

A compound D3 represented by the following formula was used.

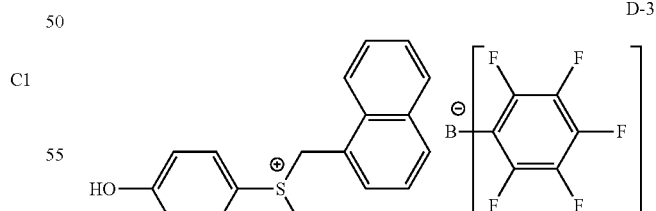

D-3

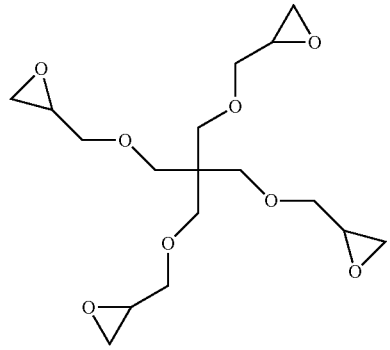

C1

Example 1

Preparation of Optically Anisotropic Layer Forming Composition

An optically anisotropic layer coating liquid (liquid crystal 1-1), an optically anisotropic layer coating liquid (liquid crystal 1-2), and an optically anisotropic layer coating liquid (liquid crystal 2) shown below were prepared.

| Optically Anisotropic Layer Coating Liquid (liquid crystal 1-1) | |
|---|---|
| Following Liquid Crystal Compound L-3: | 36.10 parts by mass |
| Following Liquid Crystal Compound L-4: | 18.90 parts by mass |
| Following Liquid Crystal Compound R-1: | 45.00 parts by mass |
| Following Polymerizable Compound A-2: | 0.50 parts by mass |
| Following Polymerization Initiator S-1 (oxime type): | 1.50 parts by mass |
| Above Specific Polymer B-101: | 0.20 parts by mass |
| Photo-Alignment Compound (above photo-sensitive polymer compound PA1): | 1.00 part by mass |
| Ethylene Oxide-Modified Trimethylolpropane Triacrylate (V#360, manufactured by OSAKA ORGANIC CHEMICAL INDUSTRY LTD.): | 12.00 parts by mass |
| Methyl Ethyl Ketone: | 424.8 parts by mass |

L-3

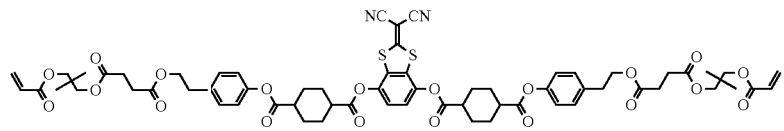

L-4

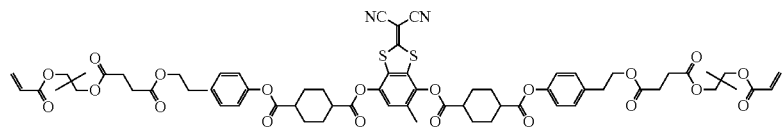

R-1

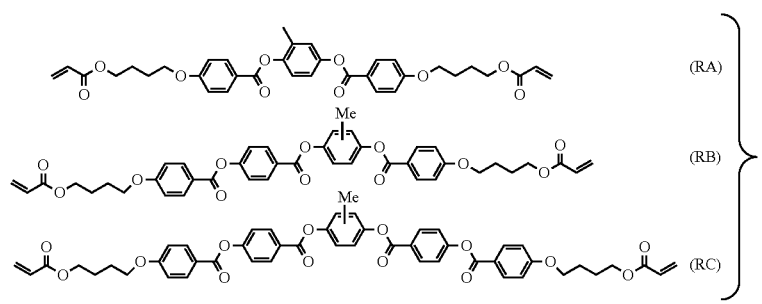

A-2

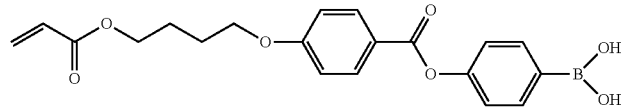

S-1

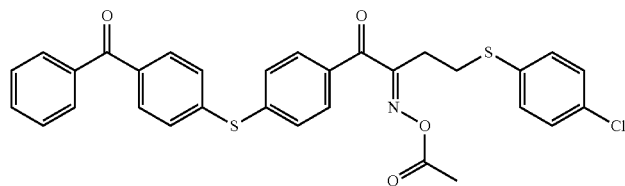 [SMILES: CC(=O)O/N=C(\CCSc1ccc(Cl)cc1)C(=O)c1ccc(Sc2ccc(C(=O)c3ccccc3)cc2)cc1]

The group adjacent to the acryloyloxy group of the liquid crystal compounds L-3 and L-4 represents a propylene group (group in which a methyl group was substituted with an ethylene group). The liquid crystal compounds L-3 and L-4 each represent a mixture of regioisomers with different methyl group positions.

The liquid crystal compound R-1 is a mixture of the liquid crystal compounds (RA), (RB), and (RC) (83:15:2 in terms of mass ratio).

| Optically Anisotropic Layer Coating Liquid (liquid crystal 1-2) | |
|---|---|
| Above Liquid Crystal Compound L-3: | 36.10 parts by mass |
| Above Liquid Crystal Compound L-4: | 18.90 parts by mass |

| Optically Anisotropic Layer Coating Liquid (liquid crystal 1-2) | |
|---|---|
| Above Liquid Crystal Compound R-1: | 45.00 parts by mass |
| Above Polymerizable Compound A-2: | 0.50 parts by mass |
| Above Polymerization Initiator S-1 (oxime type): | 1.50 parts by mass |
| Above Specific Polymer B-101: | 0.20 parts by mass |
| Photo-Alignment Compound (above photo-sensitive polymer compound PA1): | 1.00 parts by mass |
| Crosslinking Assistant (above compound D3): | 0.05 parts by mass |
| Ethylene Oxide-Modified Trimethylolpropane Triacrylate (V#360, manufactured by OSAKA ORGANIC CHEMICAL INDUSTRY LTD.): | 12.00 parts by mass |
| Methyl Ethyl Ketone: | 424.8 parts by mass |

| Optically Anisotropic Layer Coating Liquid (liquid crystal 2) | |
|---|---|
| Above Liquid Crystal Compound L-3: | 42.00 parts by mass |
| Above Liquid Crystal Compound L-4: | 42.00 parts by mass |
| Following Polymerizable Compound A-1: | 16.00 parts by mass |
| Above Polymerization Initiator S-1 (oxime type): | 0.50 parts by mass |
| Following Leveling Agent G-1: | 0.20 parts by mass |
| HISOLVE MTEM (manufactured by TOHO Chemical Industry Co., Ltd.): | 2.00 parts by mass |
| NK ESTER A-200 (manufactured by Shin-Nakamura Chemical Co., Ltd.): | 1.00 part by mass |
| Methyl Ethyl Ketone: | 424.8 parts by mass |

A-1

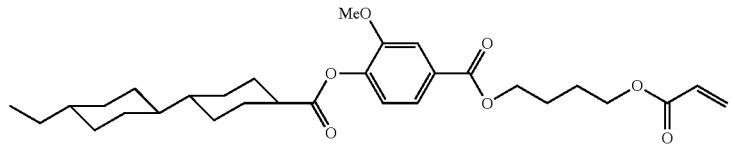 [SMILES: C=CC(=O)OCCCCOC(=O)c1ccc(OC(=O)C2CCC(C3CCC(CC)CC3)CC2)c(OC)c1]

G-1

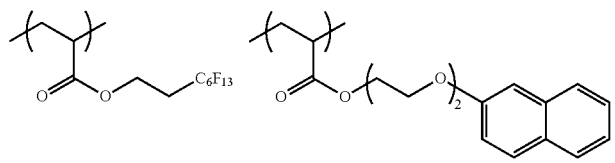

[Production of Polarizer 1]

In accordance with Example 1 of JP2001-141926A, iodine was adsorbed to a stretched polyvinyl alcohol film, and thus a polarizer 1 having a thickness of 8 μm was produced.

[Production of Cellulose Support 1]

The following composition was put into a mixing tank. The components therein were dissolved by stirring and heating to 30° C., and cellulose acylate solutions (inner layer dope A and outer layer dope B) were prepared.

| Composition of Cellulose Acylate Solution (parts by mass) | Inner Layer | Outer Layer |
|---|---|---|
| Cellulose Acetate Having Acetylation Degree of 60.9% | 100 | 100 |
| Triphenyl Phosphate (plasticizer) | 7.8 | 7.8 |
| Biphenyl Diphenyl Phosphate (plasticizer) | 3.9 | 3.9 |
| Methylene Chloride (first solvent) | 293 | 314 |
| Methanol (second solvent) | 71 | 76 |

| | | |
|---|---|---|
| -continued | | |
| 1-Butanol (third solvent) | 1.5 | 1.6 |
| Silica Particles (AEROSIL R972, manufactured by NIPPON AEROSIL CO., LTD.) | 0 | 0.8 |
| Following Additive (J-1) | 1.7 | 0 |

J-1

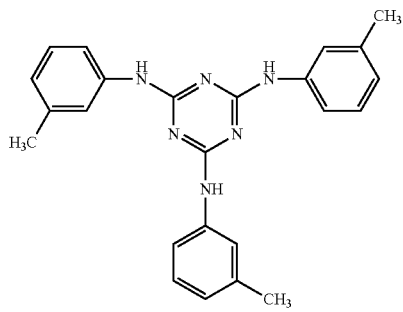 [SMILES: Cc1cccc(Nc2nc(Nc3cccc(C)c3)nc(Nc3cccc(C)c3)n2)c1]

The inner layer dope A and the outer layer dope B which had been obtained were cast on a drum cooled to 0° C. using a three-layer co-casting die. The film having a residual solvent amount of 70 mass % was separated from the drum, and both ends thereof were fixed with a pin tenter. The film was dried at 80° C. while being transported with a draw ratio of 110% in a transport direction, and dried at 110° C. in a case where the residual solvent amount became 10%.

Thereafter, the film was dried for 30 minutes at a temperature of 140° C. to manufacture a cellulose acylate film (thickness: 80 μm (outer layer: 3 μm, inner layer: 74 μm, outer layer: 3 μm)) having a residual solvent amount of 0.3 mass %. Re (550) and Rth (550) of the produced cellulose acylate film were 5 nm and 90 nm, respectively.

[Preparation of Resin Layer Forming Composition]

A resin layer coating liquid having the following composition (resin layer 1) was prepared.

| Resin Layer Coating Liquid (resin layer 1) | |
|---|---|
| Tricyclodecane Dimethanol Dimethacrylate (manufactured by Shin-Nakamura Chemical Co., Ltd., product name "DCP", following H-1) | 75.00 parts by mass |
| Following Pentaerythritol Tetraacrylate (manufactured by Shin-Nakamura Chemical Co., Ltd., product name "A-TMMT", following H-2) | 25.00 parts by mass |
| Above Polymerization Initiator S-1 (oxime type) | 1.50 parts by mass |
| Leveling Agent (following compound G-2) | 0.10 parts by mass |
| Modified Ethanol (manufactured by Wako Pure Chemical Industries, Ltd., product name "86% Ethanol-IP") | 424.8 parts by mass |

H-1

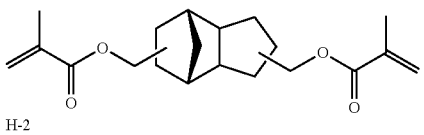

H-2

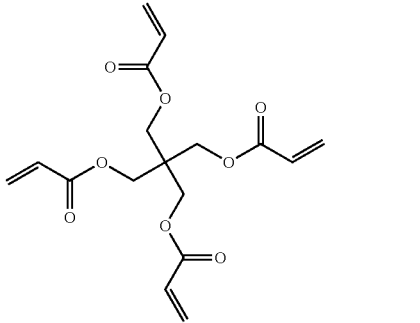 [SMILES: C=CC(=O)OCC(COC(=O)C=C)(COC(=O)C=C)COC(=O)C=C]

[Preparation of Optical Laminate]
<Formation of Optically Anisotropic Layer 1>

The resin layer forming composition prepared in advance was coated on one surface of the produced cellulose support 1 by using a die coater. After drying for 60 seconds at 100° C., the coating layer was cured by being irradiated with 60 mJ/cm² of ultraviolet rays using an extra-high-pressure mercury lamp in a nitrogen atmosphere (oxygen concentration: 100 ppm), and thus a resin layer having a thickness of 1.0 m was formed.

Next, the liquid crystal 1-1 or 1-2 (optically anisotropic layer forming composition) prepared in advance was coated on the produced resin layer by a bar coater method, and a composition layer was formed.

Next, the formed composition layer was heated for 50 seconds at 70° C. as shown in the aging conditions in the following Table 2. In this case, the liquid crystal molecules were aligned perpendicularly to the film surface.

Then, the alignment was fixed by ultraviolet irradiation (200 mJ/cm$^2$, using extra-high-pressure mercury lamp) in an atmosphere having an oxygen concentration of 3% at 60° C., and an optically anisotropic layer 1 (first optically anisotropic layer) having a thickness of 1.3 μm was formed.

The optically anisotropic layer 1 produced as described above was confirmed to be aligned perpendicularly to the film surface and to have optical performance of Rth (550) =103 nm and Rth (450)/Rth (550)=0.95.

<Formation of Optically Anisotropic Layer 2>

Next, the liquid crystal 2 (optically anisotropic layer forming composition) prepared in advance was coated on the optically anisotropic layer 1 by a bar coater method, and a composition layer was formed.

The formed composition layer was heated to 105° C., and then gradually cooled to 60° C. to stabilize the alignment. In this case, the alignment was stabilized in a smectic-A phase.

Then, the layer was kept at 60° C. and irradiated with ultraviolet rays (500 mJ/cm$^2$, using extra-high-pressure mercury lamp) in a nitrogen atmosphere (oxygen concentration: 100 ppm) to stabilize the alignment, and an optically anisotropic layer 2 (second optically anisotropic layer) having a thickness of 2.0 μm was formed.

The optically anisotropic layer 2 was confirmed to be aligned in the plane and to have optical performance of Re (550)=145 nm and Re (450)/Re (550)=0.86.

<Transfer>

The polarizer 1 produced as described above was stuck to the optically anisotropic layer 2 formed on the cellulose support 1 produced as described above by using a pressure sensitive adhesive SK-2057 (manufactured by Soken Chemical & Engineering Co., Ltd.). In this case, the polarizer and the optically anisotropic layer were stuck to each other such that the absorption axis of the polarizer 1 was perpendicular to the in-plane slow axis of the optically anisotropic layer 2.

Next, the cellulose support 1 was peeled off, and thus an optical laminate including the polarizer 1, the optically anisotropic layer 1, and the optically anisotropic layer 2 was produced.

Examples 2 to 21 and Comparative Examples 1 to 7

Optical laminates were produced in the same manner as in Example 1, except that optically anisotropic layer coating liquids prepared by changing the type of the photo-alignment compound and the type and addition amount of the specific polymer as shown in the following Table 2 were used, and the aging conditions were changed as shown in the following Table 2 in Comparative Examples 4 and 6.

[Cissing]

The number of cissing portions in the layer formed using each optically anisotropic layer forming composition was counted in a surface having a size of 15 cm×20 cm in the production of the optical laminates of the examples and the comparative examples. Here, in the evaluation of the optically anisotropic layer 1, a region in the surface of the resin layer where no optically anisotropic layer 1 was formed was counted as one cissing portion, and in the evaluation of the optically anisotropic layer 2, a region in the surface of the lower layer (optically anisotropic layer 1) where no upper layer (optically anisotropic layer 2) was formed was counted as one cissing portion. Based on the results thereof, the evaluation was performed with the following criteria. The results are shown in the following Table 2.

In a case where the evaluation result is A or B, the production efficiency is excellent, and it is possible to suitably use the laminate. It is more preferable that the evaluation result is A.

A: The number of cissing portions is 1 or less.
B: The number of cissing portions is 2 or 3.
C: The number of cissing portions is 4 to 9.
D: The number of cissing portions is 10 or more.

[Plane State]

A plane state of the optically anisotropic layer formed using each optically anisotropic layer forming composition was visually confirmed and evaluated with the following criteria. The results are shown in the following Table 2.

In a case where the evaluation result is A or B, the production efficiency is excellent, and it is possible to suitably use the laminate. It is more preferable that the evaluation result is A.

A: There is neither drying unevenness nor wrinkles.
B: Although slight drying unevenness is seen, the laminate can be used without problems.
C: Although there are more drying unevenness and roughness than B, the laminate can be used without problems.
D: Obvious roughness due to drying unevenness is seen, and thus the laminate is not suitable for use.

[Aligning Properties]

In producing the optical laminate in each of the examples and the comparative examples, each of the optically anisotropic layer 1 and the optically anisotropic layer 2 was observed using a polarizing microscope in a state of being deviated by 2 degrees from the extinction position. The results thereof were evaluated with the following criteria. The results are shown in the following Table 2.

A: There is no disorder of liquid crystal directors, and the plane state is stable.
B: There is slight disorder of liquid crystal directors, and the plane state is stable.
C: There is partial disorder of liquid crystal directors, and the plane state is stable.
D: Liquid crystal directors are significantly disordered, and the plane state is unstable, whereby display performance is very poor.

TABLE 2

| | Photo-Alignment Compound | | | Specific Polymer | | | Optically Anisotropic Layer | |
| | | | | | | Addition | | |
| | Type | Mw | Addition Amount* | Type | Mw | Amount* | 1 (lower layer) | 2 (upper layer) |
|---|---|---|---|---|---|---|---|---|
| Example 1 | PA1 | 11200 | 1 | B-101 | 1800 | 0.2 | Liquid Crystal 1-2 | Liquid Crystal 2 |
| Example 2 | PA2 | 12800 | 1 | B-102 | 1800 | 0.2 | Liquid Crystal 1-1 | Liquid Crystal 2 |

TABLE 2-continued

| | | | | | | | | |
|---|---|---|---|---|---|---|---|---|
| Example 3 | PA3 | 18300 | 1 | B-103 | 1500 | 0.12 | Liquid Crystal 1-2 | Liquid Crystal 2 |
| Example 4 | PA4 | 19800 | 5 | B-104 | 1600 | 0.3 | Liquid Crystal 1-1 | Liquid Crystal 2 |
| Example 5 | PA5 | 23100 | 1 | B-105 | 1500 | 0.18 | Liquid Crystal 1-2 | Liquid Crystal 2 |
| Example 6 | PA6 | 34400 | 0.02 | B-106 | 1900 | 0.4 | Liquid Crystal 1-2 | Liquid Crystal 2 |
| Example 7 | PA5 | 23100 | 3 | B-107 | 2100 | 0.5 | Liquid Crystal 1-2 | Liquid Crystal 2 |
| Example 8 | PA6 | 34400 | 1 | B-108 | 1600 | 0.1 | Liquid Crystal 1-2 | Liquid Crystal 2 |
| Example 9 | PA1 | 11200 | 0.03 | B-109 | 3600 | 0.002 | Liquid Crystal 1-2 | Liquid Crystal 2 |
| Example 10 | PA3 | 18300 | 3 | B-110 | 3100 | 2.8 | Liquid Crystal 1-2 | Liquid Crystal 2 |
| Example 11 | PA4 | 19800 | 2 | B-101 | 1800 | 0.18 | Liquid Crystal 1-1 | Liquid Crystal 2 |
| Example 12 | PA7 | 40200 | 1 | B-101 | 1800 | 0.2 | Liquid Crystal 1-1 | Liquid Crystal 2 |
| Example 13 | PA8 | 35400 | 1.2 | B-102 | 1800 | 0.15 | Liquid Crystal 1-1 | Liquid Crystal 2 |
| Example 14 | PA9 | 22000 | 1.2 | B-103 | 1500 | 0.12 | Liquid Crystal 1-2 | Liquid Crystal 2 |
| Example 15 | PA10 | 36200 | 6 | B-104 | 1600 | 0.3 | Liquid Crystal 1-2 | Liquid Crystal 2 |
| Example 16 | PA11 | 25800 | 1 | B-105 | 1500 | 0.18 | Liquid Crystal 1-2 | Liquid Crystal 2 |
| Example 17 | PA9 | 22000 | 0.02 | B-106 | 1900 | 0.4 | Liquid Crystal 1-2 | Liquid Crystal 2 |
| Example 18 | PA11 | 25800 | 3 | B-107 | 2100 | 0.5 | Liquid Crystal 1-2 | Liquid Crystal 2 |
| Example 19 | PA10 | 36200 | 3 | B-108 | 1600 | 0.1 | Liquid Crystal 1-2 | Liquid Crystal 2 |
| Example 20 | PA9 | 22000 | 0.02 | B-109 | 3600 | 0.002 | Liquid Crystal 1-2 | Liquid Crystal 2 |
| Example 21 | PA10 | 36200 | 0.4 | B-110 | 3100 | 3.6 | Liquid Crystal 1-2 | Liquid Crystal 2 |
| Comparative Example 1 | PA1 | 11200 | 1 | None | — | — | Liquid Crystal 1-2 | Liquid Crystal 2 |
| Comparative Example 2 | PA7 | 40200 | 1 | None | — | — | Liquid Crystal 1-1 | Liquid Crystal 2 |
| Comparative Example 3 | PA3 | 18300 | 1 | H-101 | 1500 | 0.2 | Liquid Crystal 1-2 | Liquid Crystal 2 |
| Comparative Example 4 | PA3 | 18300 | 1 | H-101 | 1500 | 0.2 | Liquid Crystal 1-2 | Liquid Crystal 2 |
| Comparative Example 5 | PA9 | 22000 | 1 | H-101 | 1500 | 0.2 | Liquid Crystal 1-2 | Liquid Crystal 2 |
| Comparative Example 6 | PA9 | 22000 | 1 | H-101 | 1500 | 0.2 | Liquid Crystal 1-2 | Liquid Crystal 2 |
| Comparative Example 7 | None | — | — | B-104 | 1600 | 0.4 | Liquid Crystal 1-2 | Liquid Crystal 2 |

| | Aging Conditions | | Evaluation | | | | | |
|---|---|---|---|---|---|---|---|---|
| | | | Optically Anisotropic Layer 1 | | | Optically Anisotropic Layer 2 | | |
| | Temperature (° C.) | Time (seconds) | Cissing | Plane State | Aligning Properties | Cissing | Plane State | Aligning Properties |
| Example 1 | 70 | 50 | A | A | A | A | A | A |
| Example 2 | 70 | 50 | A | A | A | A | A | A |
| Example 3 | 70 | 50 | A | A | A | A | A | A |
| Example 4 | 70 | 50 | A | A | B | A | A | A |
| Example 5 | 70 | 50 | A | A | A | A | A | A |
| Example 6 | 70 | 50 | A | A | A | A | A | B |
| Example 7 | 70 | 50 | A | A | A | A | A | A |
| Example 8 | 70 | 50 | A | A | A | A | A | A |
| Example 9 | 70 | 50 | B | B | A | A | A | B |
| Example 10 | 70 | 50 | A | A | B | A | A | B |
| Example 11 | 70 | 50 | A | A | A | A | A | A |
| Example 12 | 70 | 50 | A | A | A | A | A | A |
| Example 13 | 70 | 50 | A | A | A | A | A | A |
| Example 14 | 70 | 50 | A | A | A | A | A | A |
| Example 15 | 70 | 50 | A | A | B | A | A | A |
| Example 16 | 70 | 50 | A | A | A | A | A | A |
| Example 17 | 70 | 50 | A | A | A | A | A | B |
| Example 18 | 70 | 50 | A | A | A | A | A | A |
| Example 19 | 70 | 50 | A | A | A | A | A | A |
| Example 20 | 70 | 50 | B | B | A | A | A | B |
| Example 21 | 70 | 50 | A | A | B | A | A | B |
| Comparative Example 1 | 70 | 50 | D | D | C | C | C | B |
| Comparative Example 2 | 70 | 50 | D | D | C | C | C | B |
| Comparative Example 3 | 70 | 50 | D | C | C | D | C | C |
| Comparative Example 4 | 80 | 60 | D | C | B | D | C | C |
| Comparative Example 5 | 70 | 50 | D | C | C | D | C | C |
| Comparative Example 6 | 80 | 60 | D | C | B | D | C | C |
| Comparative Example 7 | 70 | 50 | A | A | B | A | A | D |

*mass % with respect to the total mass of the liquid crystal compound in the optically anisotropic layer coating liquid.

As shown in Table 2, from the comparison results between Example 1 and Comparative Example 1, the comparison results between Example 3 and Comparative Examples 3 and 4, the comparison results between Example 12 and Comparative Example 2, and the comparison results between Example 14 and Comparative Examples 5 and 6, it has been found that the liquid crystal compound can be aligned even under aging conditions of temperature lower than 80° C. and time shorter than 60 seconds, and thus it is possible to maintain performance such as a plane state of an optically anisotropic layer to be produced.

In addition, as shown in Comparative Example 7, it has been found that in using a liquid crystal composition containing no photo-alignment compound, the alignment of the upper layer (optically anisotropic layer 2) is poor in a case where the lower layer is not subjected to the alignment treatment.

[Mounting on Liquid Crystal Display Device and Display Performance Evaluation]

<Mounting on Liquid Crystal Display Device>

An IPS mode liquid crystal display device iPad (registered trademark) (manufactured by Apple Inc.) was disassembled, and a front-side polarizing plate was peeled off from a liquid crystal cell. Next, the optical laminate of the example produced as described above was prepared, and it was adhered to the front side of the liquid crystal cell by using a pressure sensitive adhesive SK-2057 (manufactured by Soken Chemical & Engineering Co., Ltd.) to produce a liquid crystal display device. In this case, the mounting was performed such that absorption axis of the polarizer of the optical laminate of the example was perpendicular to the absorption axis of the rear-side polarizing plate, and the optically anisotropic layer was disposed closer to the liquid crystal cell side than the polarizer.

<Evaluation of Liquid Crystal Display Device>

The liquid crystal display device on which the optical laminate of the example was mounted was confirmed to have high front CR equal to that of the product and to have a larger view angle CR than the product. Moreover, the above liquid crystal display device had little color change in a case of being visually confirmed in an oblique direction at the time of black display, and had excellent characteristics as a liquid crystal display device.

What is claimed is:

1. A liquid crystal composition comprising:
   a liquid crystal compound;
   a photo-alignment compound; and
   a polymer obtained by polymerizing a monomer having two or more radically polymerizable double bonds and one or more hydroxyl groups,
   wherein the photo-alignment compound is a photo-sensitive compound having a photo-reactive group which is subjected to at least one of dimerization or isomerization by the action of light, and
   the photo-reactive group has a skeleton of at least one type of derivative or compound selected from the group consisting of cinnamic acid derivations, courmarin derivatives, chalcone derivations, maleimide derivatives, azobenzene compounds, stilbene compounds and spiropyran compounds.

2. The liquid crystal composition according to claim 1, wherein the polymer is obtained by polymerizing a monomer represented by Formula X, $$Z^{X1}\text{-}L^{X1}\text{-}L^{X2}\text{-}(\text{-}L^{X3}\text{-}L^{X4}\text{-}Z^{X2})_n$$ Formula X in Formula X, $Z^{X1}$ and $Z^{X2}$ each independently represent a group having a radically polymerizable double bond, $L^{X1}$ and $L^{X4}$ each independently represent a single bond or an alkylene group having a hydroxyl group, $L^{X2}$ and $L^{X3}$ each independently represent a single bond, or a divalent linking group formed of at least one selected from the group consisting of —O—, —(C=O)O—, —O(C=O)—, a divalent chain group, an alkylene group having a hydroxyl group, and a divalent aliphatic cyclic group, at least one of $L^{X1}$ to $L^{X4}$ is an alkylene group having a hydroxyl group, M represents a single bond or a di- to tetra-valent linking group, and n represents an integer of 1 to 3.

3. The liquid crystal composition according to claim 1, wherein the polymer is obtained by polymerizing a monomer represented by Formula X1,

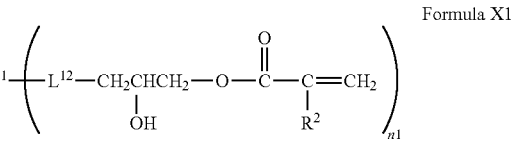

Formula X1 in Formula X1, $R^1$ and $R^2$ each independently represent a hydrogen atom or an alkyl group having 1 to 20 carbon atoms, $L^{11}$ and $L^{12}$ each independently represent a single bond, or a divalent linking group formed of at least one selected from the group consisting of —O—, —(C=O)O—, —O(C=O)—, a divalent chain group, an alkylene group having a hydroxyl group, and a divalent aliphatic cyclic group, $M^1$ represents a single bond or a di- to tetra-valent linking group, and n1 represents an integer of 1 to 3.

4. The liquid crystal composition according to claim 1, wherein the polymer has a partial structure obtained by polymerizing a compound having a fluorine atom.

5. The liquid crystal composition according to claim 4, wherein the compound having a fluorine atom is represented by Formula a,

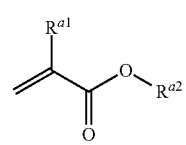

Formula a in Formula a, $R^{a1}$ represents a hydrogen atom or an alkyl group having 1 to 20 carbon atoms, and $R^{a2}$ represents an alkyl group having 1 to 20 carbon atoms or an alkenyl group having 2 to 20 carbon atoms in which at least one carbon atom has a fluorine atom as a substituent.

6. An optically anisotropic layer which is formed using the liquid crystal composition according to claim 1.

7. An optical laminate comprising:
a support; and
a first optically anisotropic layer provided on the support,
wherein the first optically anisotropic layer is the optically anisotropic layer according to claim 6.

8. The optical laminate according to claim 6, further comprising:
a second optically anisotropic layer provided on the first optically anisotropic layer.

9. The optical laminate according to claim 8,
wherein the second optically anisotropic layer is formed using a liquid crystal composition containing a liquid crystal compound.

10. The optical laminate according to claim 8,
wherein the first optically anisotropic layer and the second optically anisotropic layer are in contact with each other.

11. An image display device comprising:
the optically anisotropic layer according to claim 6.

12. An image display device comprising:
the optical laminate according to claim 7.

* * * * *